(12) United States Patent
Meyer et al.

(10) Patent No.: US 10,513,256 B2
(45) Date of Patent: Dec. 24, 2019

(54) METHODS AND SYSTEM FOR IMPROVING HYBRID VEHICLE TRANSMISSION GEAR SHIFTING

(71) Applicant: Ford Global Technologies, LLC, Dearborn, MI (US)

(72) Inventors: Jason Meyer, Canton, MI (US); Jeffrey Allen Doering, Canton, MI (US); Xiaoyong Wang, Novi, MI (US); Matthew John Shelton, Grosse Ile, MI (US); Christopher John Teslak, Plymouth, MI (US); Kenneth James Miller, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 275 days.

(21) Appl. No.: 15/455,013

(22) Filed: Mar. 9, 2017

(65) Prior Publication Data
US 2018/0257633 A1    Sep. 13, 2018

(51) Int. Cl.
| | |
|---|---|
| *B60W 20/13* | (2016.01) |
| *B60W 10/02* | (2006.01) |
| *B60W 10/08* | (2006.01) |
| *B60W 10/113* | (2012.01) |
| *B60W 10/06* | (2006.01) |

(Continued)

(52) U.S. Cl.
CPC .............. *B60W 20/13* (2016.01); *B60K 6/52* (2013.01); *B60W 10/02* (2013.01); *B60W 10/06* (2013.01); *B60W 10/08* (2013.01); *B60W 10/113* (2013.01); *B60W 30/1846* (2013.01); *B60W 30/19* (2013.01); *B60W 2510/0275* (2013.01); *B60W 2510/0657* (2013.01); *B60W 2510/083* (2013.01); *B60W 2510/1005* (2013.01); *B60W 2510/1025* (2013.01); *B60W 2510/1095* (2013.01); *B60W 2510/244* (2013.01); *B60W 2710/027* (2013.01); *B60W 2710/0666* (2013.01); *B60W 2710/083* (2013.01); *B60W 2710/1005* (2013.01);

(Continued)

(58) Field of Classification Search
None
See application file for complete search history.

(56) References Cited

U.S. PATENT DOCUMENTS

| | | |
|---|---|---|
| 6,193,628 B1 | 2/2001 | Hrovat et al. |
| 7,261,671 B2 | 8/2007 | Ortmann et al. |

(Continued)

FOREIGN PATENT DOCUMENTS

| | | |
|---|---|---|
| CN | 105179675 A | 12/2015 |

OTHER PUBLICATIONS

Meyer, Jason, et al., "Method and System for Improving Hybrid Vehicle Transmission Gear Shifting," U.S. Appl. No. 15/454,983, filed Mar. 9, 2017, 105 pages.

*Primary Examiner* — Christian Chace
*Assistant Examiner* — Kyung J Kim
(74) *Attorney, Agent, or Firm* — David Kelley; McCoy Russell LLP

(57) ABSTRACT

Methods and systems are provided for operating a driveline of a hybrid vehicle that may include an internal combustion engine, a rear drive unit electric machine, an integrated starter/generator, and a transmission are described. In one example, torque capacity of an on-coming clutch is adjusted during an inertia phase of a power-on upshift to improve shift smoothness.

20 Claims, 11 Drawing Sheets

(51) Int. Cl.
*B60K 6/52* (2007.10)
*B60W 30/184* (2012.01)
*B60W 30/19* (2012.01)

(52) U.S. Cl.
CPC ............... *B60W 2710/1022* (2013.01); *B60W 2710/242* (2013.01); *Y02T 10/6286* (2013.01); *Y10S 903/93* (2013.01)

(56) References Cited

U.S. PATENT DOCUMENTS

| | | |
|---|---|---|
| 7,713,164 B2 | 5/2010 | Silveri et al. |
| 8,061,462 B2 | 11/2011 | Soliman et al. |
| 8,137,236 B2 | 3/2012 | Soliman et al. |
| 8,224,513 B2 | 7/2012 | Soliman et al. |
| 8,706,337 B2 | 4/2014 | Rauner et al. |
| 8,795,131 B2 | 8/2014 | Yamazaki et al. |
| 8,808,141 B2 | 8/2014 | Shelton et al. |
| 9,056,610 B2 | 6/2015 | Soliman et al. |
| 2009/0118936 A1 | 5/2009 | Heap et al. |
| 2009/0233757 A1 | 9/2009 | Soliman et al. |
| 2014/0100071 A1 | 4/2014 | Kimes |
| 2014/0163827 A1 | 6/2014 | Kim |
| 2014/0171259 A1 | 6/2014 | Genise |
| 2015/0134173 A1 | 5/2015 | Choi et al. |
| 2015/0360674 A1 | 12/2015 | Nefcy et al. |
| 2018/0244260 A1* | 8/2018 | Ruybal ................ B60W 20/19 |

* cited by examiner

METHODS AND SYSTEM FOR IMPROVING HYBRID VEHICLE TRANSMISSION GEAR SHIFTING

FIELD

The present description relates generally to methods and systems for controlling a driveline of a hybrid vehicle. The methods and systems may be particularly useful for hybrid vehicles that include an electric machine located downstream of a transmission in the driveline.

BACKGROUND/SUMMARY

A vehicle driveline may produce torque at an engine and transfer the engine torque to vehicle wheels through a step ratio transmission. As vehicle speed increases, the step ratio transmission may engage a first gear and disengage a second gear in order to operate the engine in a desired speed range. A first clutch may open to release the first gear and a second clutch may close to engage the second gear. If the transmission is upshifting, the transmission provides a first torque ratio in the first gear that is higher than a second torque ratio provided by the transmission while engaged in the second gear. Consequently, if engine torque is maintained constant throughout a gear shift, there may be a drop in wheel torque that results from entering the new gear (e.g., the second gear). The drop in observed wheel torque may be described as a "torque hole," and the drop in wheel torque may be particularly noticeable during the shift when the off-going clutch is being released and the on-coming clutch is being applied. Thus, it may be desirable to operate the driveline in a way that provides a near constant rate of acceleration so that vehicle drivability may be improved.

The inventors herein have recognized the above-mentioned issues and have developed a driveline operating method, comprising: during a first condition, adjusting a transmission input torque actuator during a power-on upshift torque transfer phase via a controller in response to a transmission instantaneous lower input torque threshold, the transmission instantaneous lower input torque threshold responsive to torque capacity of an on-coming clutch, a torque ratio of a transmission engaged in a first gear, and a torque ratio of the transmission engaged in a second gear.

By adjusting a transmission input torque actuator during a power-on upshift, it may be possible to fill a torque hole that may occur during a torque transfer phase of a power-on upshift when an off-going clutch is being released and an on-coming clutch is being applied. In particular, increasing the transmission input torque may improve wheel torque delivery by transferring transmission input torque through the old gear that is being disengaged and the new gear being engaged. The transmission input torque may be increased via increasing torque output of an engine, an integrated starter/generator, or the engine and the integrated starter generator.

The present description may provide several advantages. For example, the approach may provide for smooth torque delivery from an engine to vehicle wheels. Further, the approach also provides for adjusting output of a rear drive unit electric machine to compensate for torque disturbances that may occur during power-on upshifts. In addition, the torque capacity of an on-coming clutch may be adjusted during the torque transfer phase and inertia phases of the power-on upshift to improve shift smoothness and torque transfer between torque sources in a vehicle driveline.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 4:
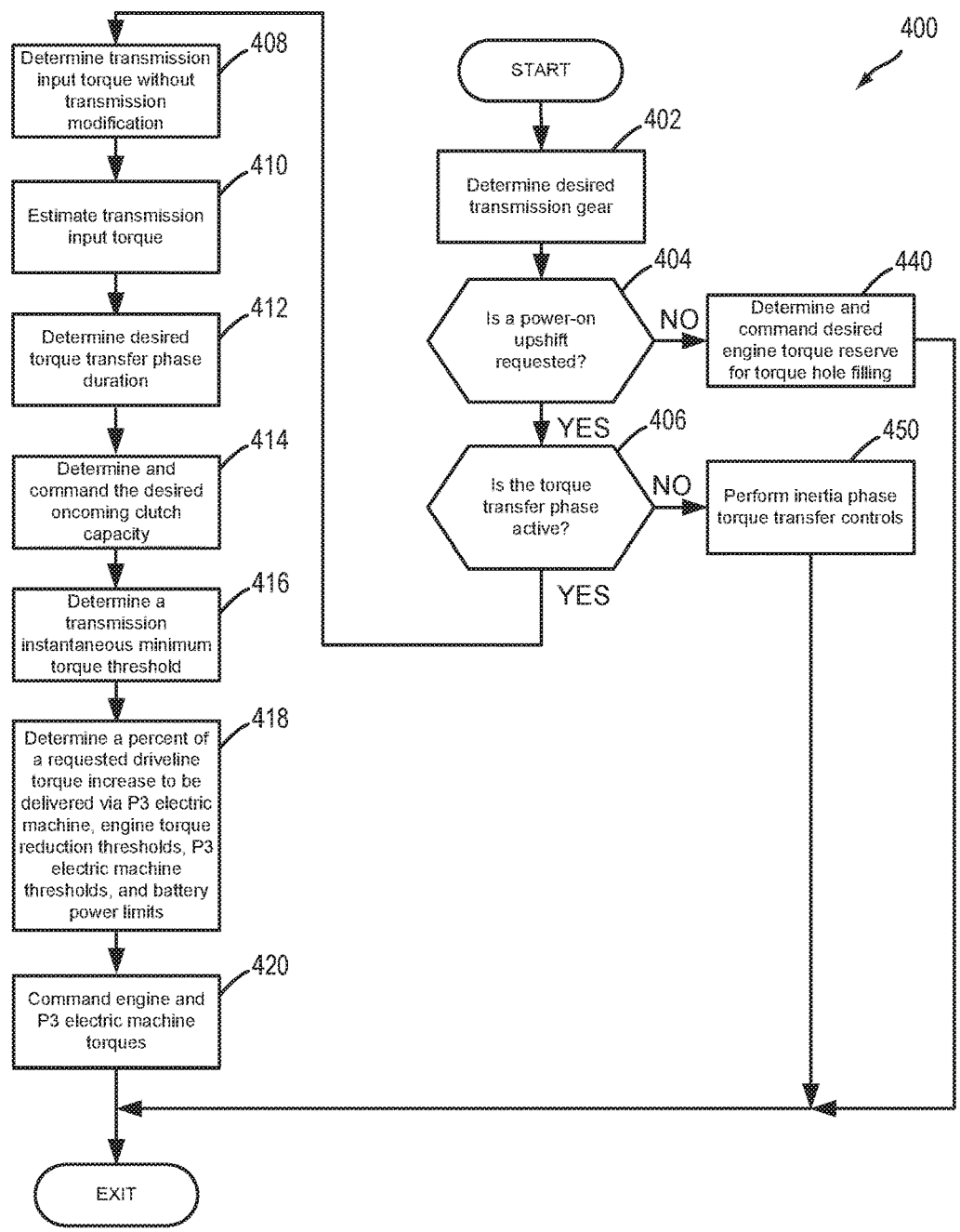
FIG. 4 is a flowchart of a method for a power-on upshift of a transmission.
Figure 5:
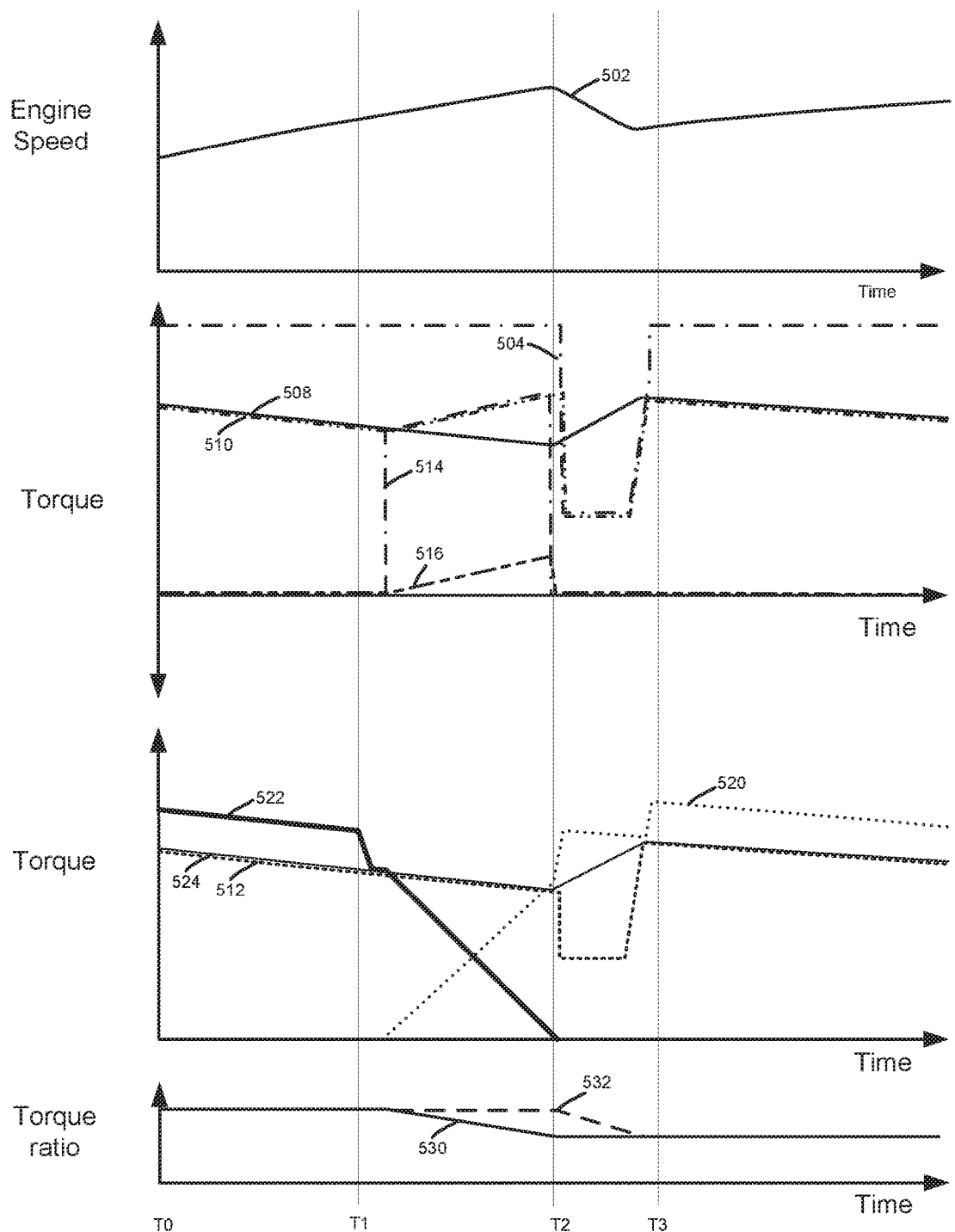
FIGS. 5-6 show plots of example "torque hole" filling during transmission gear shifting according to the method of FIG. 4.
Figure 6:
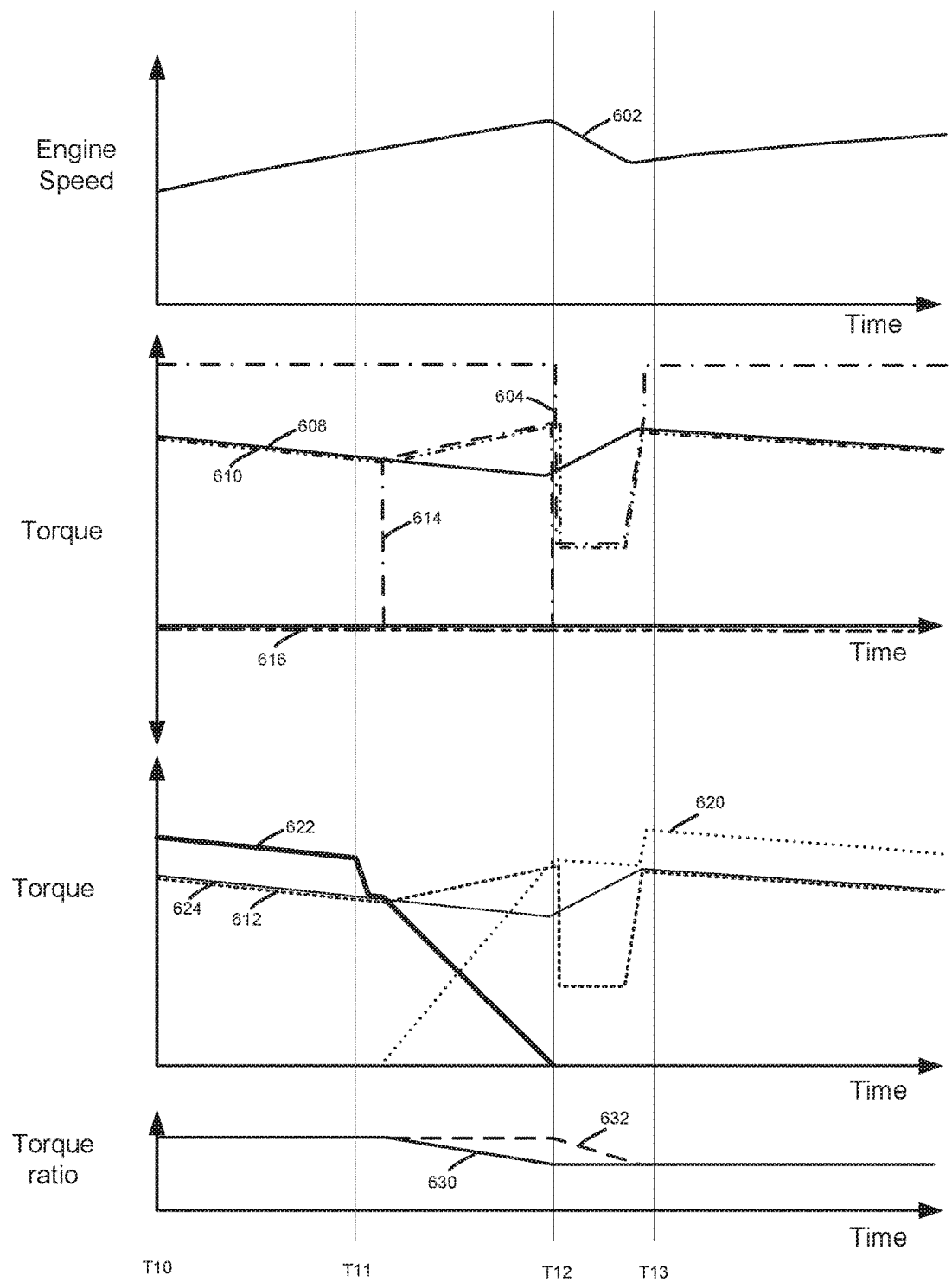
Figure 7:
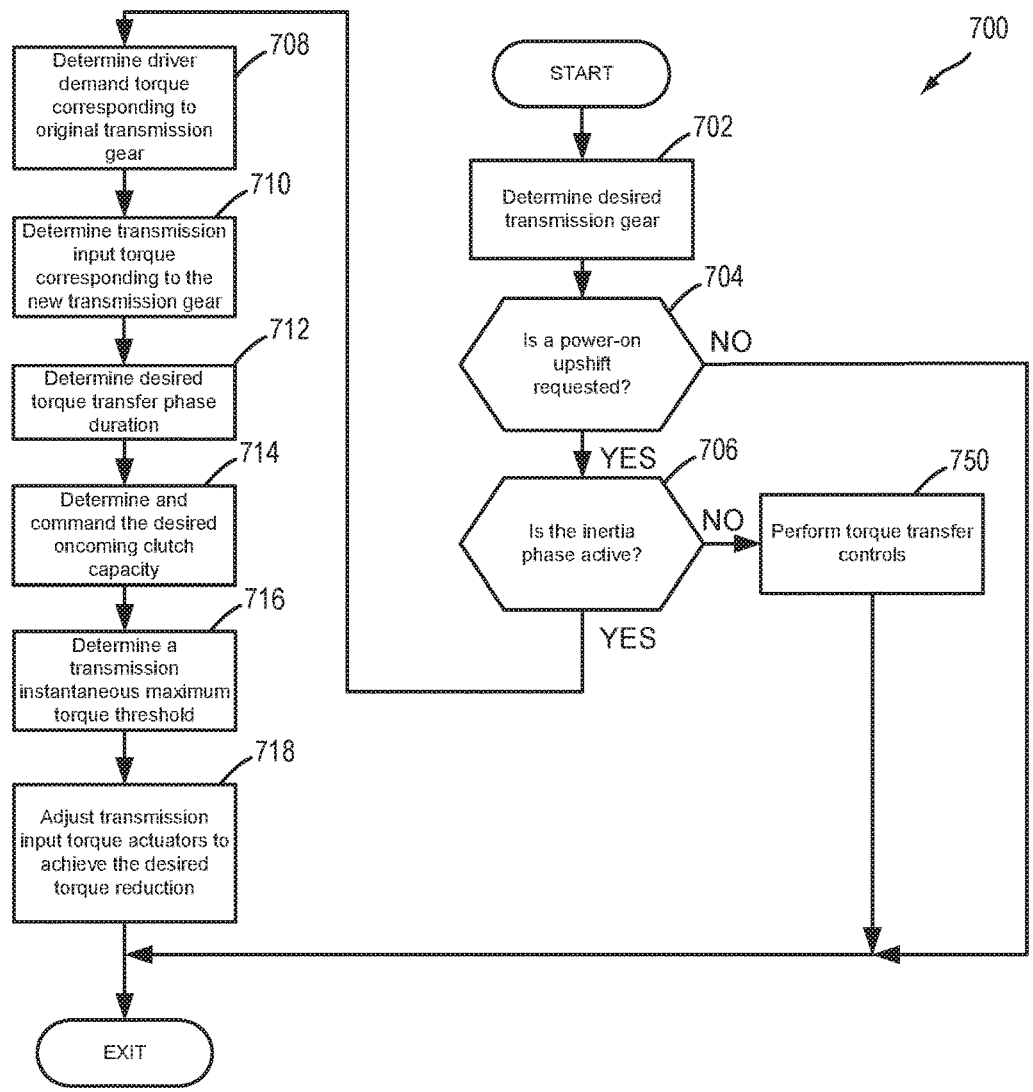
FIG. 7 is a flowchart of a method for shifting a transmission while managing energy flow through the transmission.
Figure 8:
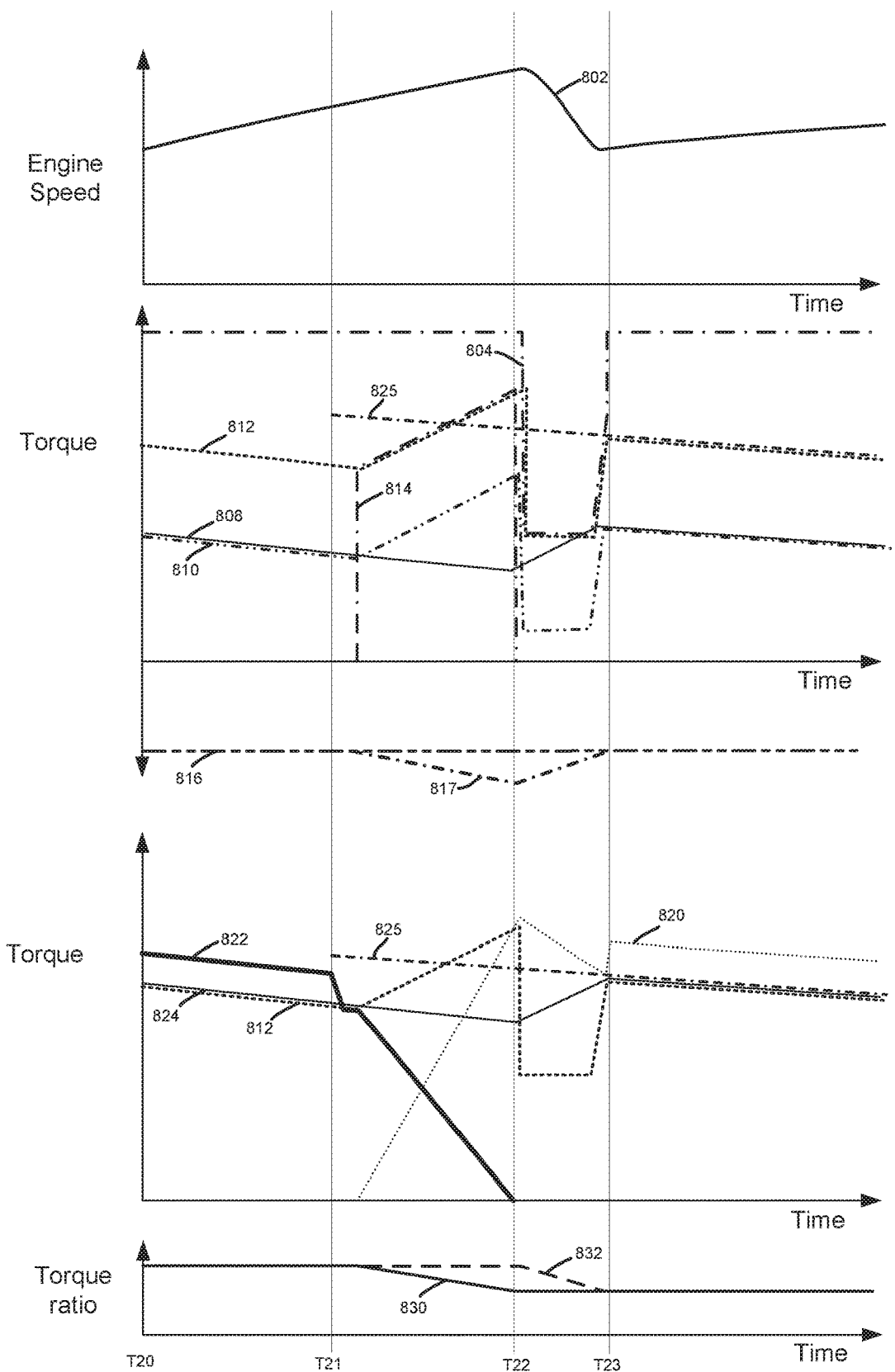
FIGS. 8-10 show example plots of shifting a transmission while managing energy flow through the transmission.
Figure 9:
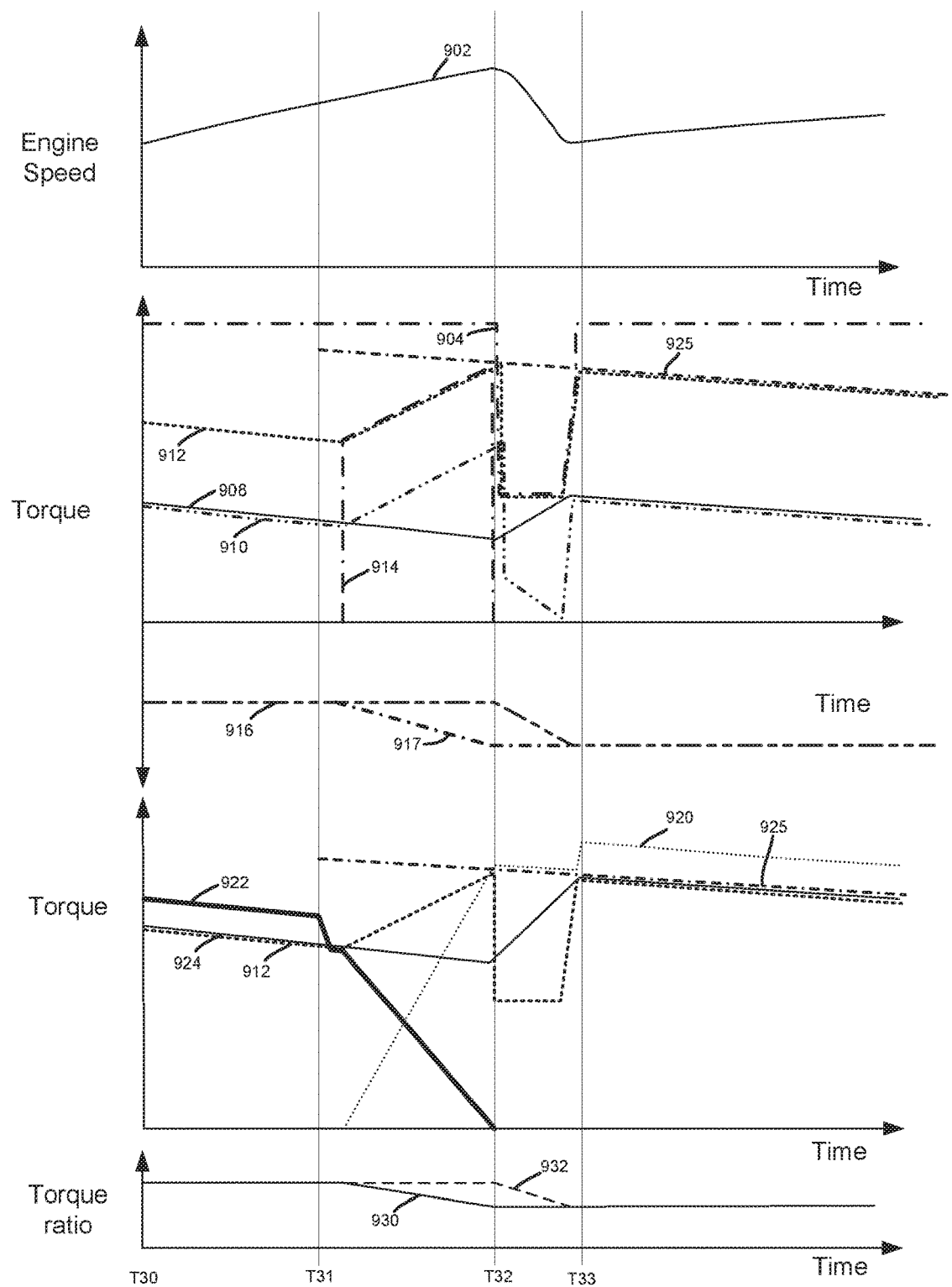
Figure 10:
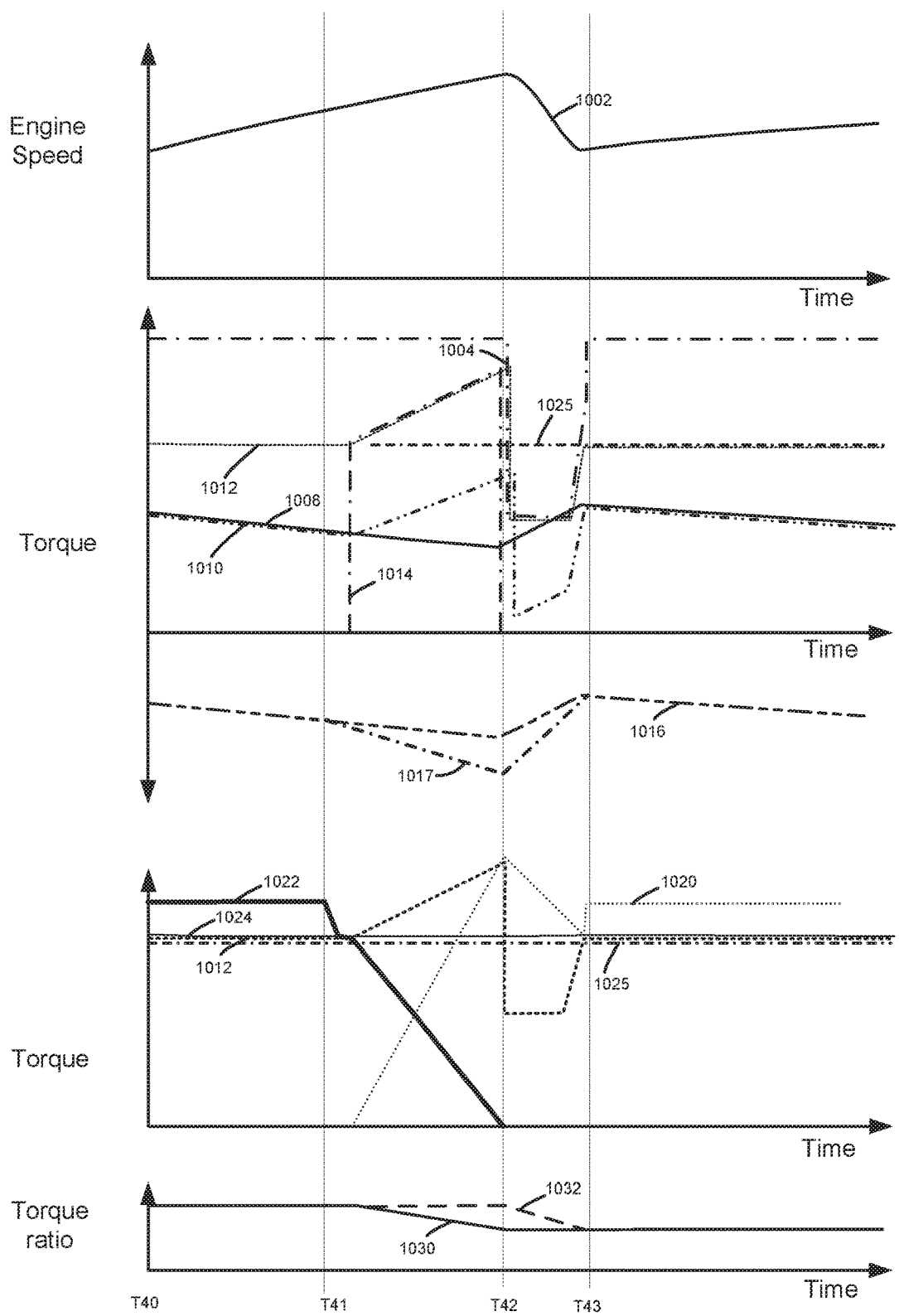

The following description relates to systems and methods for operating a driveline of a hybrid vehicle. FIGS. 1A-3 show an example hybrid vehicle system that includes a driveline with a motor, an integrated starter/generator, a dual clutch transmission, and a rear drive unit with an electric machine that is positioned downstream of the dual clutch transmission. FIG. 4 shows a method for shifting a transmission of a hybrid vehicle during a power-on upshift. The hybrid vehicle may be shifted according to the method of FIG. 4 as shown in FIGS. 5 and 6. FIG. 7 shows a method for shifting a transmission while managing energy flow through the transmission. FIGS. 8-10 show prophetic example plots of shifting a transmission according to the method of FIG. 7.

Figure 1A:
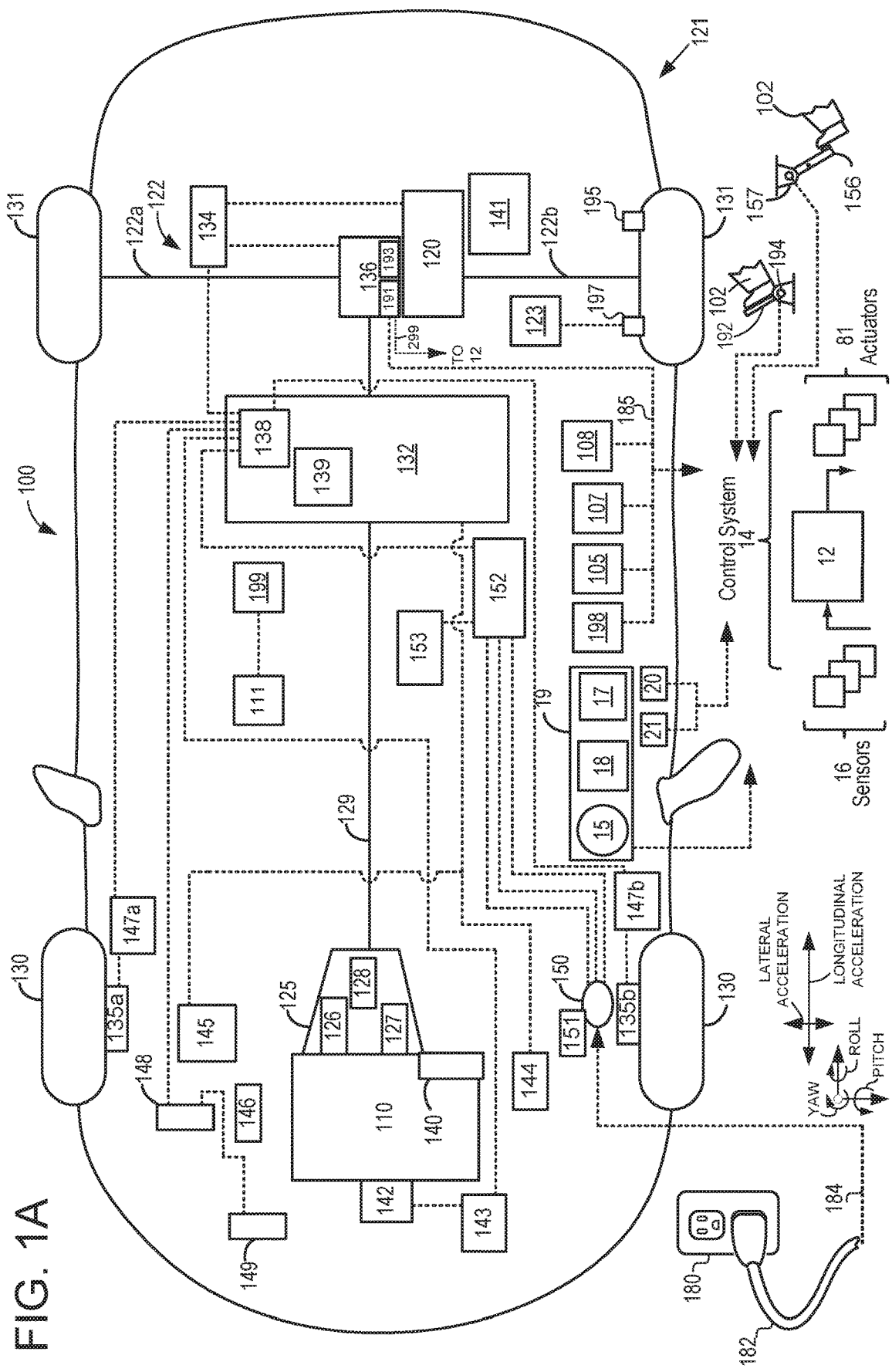
FIG. 1A is a schematic diagram of a hybrid vehicle driveline.

FIG. 1A illustrates an example vehicle propulsion system 100 for vehicle 121. Vehicle propulsion system 100 includes at least two power sources including an internal combustion engine 110 and an electric machine 120. Electric machine 120 may be configured to utilize or consume a different energy source than engine 110. For example, engine 110 may consume liquid fuel (e.g. gasoline) to produce an engine output while electric machine 120 may consume electrical energy to produce an electric machine output. As such, a vehicle with propulsion system 100 may be referred to as a hybrid electric vehicle (HEV). Throughout the description of FIG. 1A, mechanical connections between various components is illustrated as solid lines, whereas electrical connections between various components are illustrated as dashed lines.

Vehicle propulsion system 100 has a front axle (not shown) and a rear axle 122. In some examples, rear axle may comprise two half shafts, for example first half shaft 122a, and second half shaft 122b. Vehicle propulsion system 100 further has front wheels 130 and rear wheels 131. The rear axle 122 is coupled to electric machine 120 and to transmission 125 via driveshaft 129. The rear axle 122 may be driven either purely electrically and exclusively via electric machine 120 (e.g., electric only drive or propulsion mode, engine is not combusting air and fuel or rotating), in a hybrid fashion via electric machine 120 and engine 110 (e.g., parallel mode), or exclusively via engine 110 (e.g., engine only propulsion mode), in a purely combustion engine-operated fashion. Rear drive unit 136 may transfer power from engine 110 or electric machine 120, to axle 122, resulting in rotation of drive wheels 131. Rear drive unit 136 may include a gear set, differential 193, and an electrically controlled differential clutch 191 that adjusts torque transfer to axle 122a and to axle 122b. In some examples, electrically controlled differential clutch 191 may communicate a torque capacity of the electrically controlled differential clutch via CAN bus 299. Torque transfer to axle 122a and 122b may be equal when electrically controlled differential clutch is open. Torque transfer to axle 122a may be different from torque transferred to axle 122b when electrically controlled differential clutch 191 is partially closed (e.g., slipping such that speed input to the clutch is different than speed output of the clutch) or closed. Rear drivel unit 136 may also include one or more clutches (not shown) to decouple transmission 125 and electric machine 120 from wheels 131. Rear drive unit 136 may be directly coupled to electric machine 120 and axle 122.

A transmission 125 is illustrated in FIG. 1A as connected between engine 110, and electric machine 120 assigned to rear axle 122. In one example, transmission 125 is a dual clutch transmission (DCT). In an example wherein transmission 125 is a DCT, DCT may include a first clutch 126, a second clutch 127, and a gear box 128. DCT 125 outputs torque to drive shaft 129 to supply torque to wheels 131. As will be discussed in further detail below with regard to FIG. 2, transmission 125 may shift gears by selectively opening and closing first clutch 126 and second clutch 127.

Electric machine 120 may receive electrical power from onboard electrical energy storage device 132. Furthermore, electric machine 120 may provide a generator function to convert engine output or the vehicle's kinetic energy into electrical energy, where the electrical energy may be stored at electric energy storage device 132 for later use by the electric machine 120 or integrated starter/generator 142. A first inverter system controller (ISC1) 134 may convert alternating current generated by electric machine 120 to direct current for storage at the electric energy storage device 132 and vice versa. Electric energy storage device 132 may be a battery, capacitor, inductor, or other electric energy storage device.

In some examples, electric energy storage device 132 may be configured to store electrical energy that may be supplied to other electrical loads residing on-board the vehicle (other than the motor), including cabin heating and air conditioning, engine starting, headlights, cabin audio and video systems, etc.

Control system 14 may communicate with one or more of engine 110, electric machine 120, energy storage device 132, integrated starter/generator 142, transmission 125, etc. Control system 14 may receive sensory feedback information from one or more of engine 110, electric machine 120, energy storage device 132, integrated starter/generator 142, transmission 125, etc. Further, control system 14 may send control signals to one or more of engine 110, electric machine 120, energy storage device 132, transmission 125, etc., responsive to this sensory feedback. Control system 14 may receive an indication of an operator requested output of the vehicle propulsion system from a human operator 102, or an autonomous controller. For example, control system 14 may receive sensory feedback from pedal position sensor 194 which communicates with pedal 192. Pedal 192 may refer schematically to an accelerator pedal. Similarly, control system 14 may receive an indication of an operator requested vehicle braking via a human operator 102, or an autonomous controller. For example, control system 14 may receive sensory feedback from pedal position sensor 157 which communicates with brake pedal 156.

Energy storage device 132 may periodically receive electrical energy from a power source 180 (e.g., a stationary power grid) residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 132 from power source 180 via an electrical energy transmission cable 182. During a recharging operation of energy storage device 132 from power source 180, electrical transmission cable 182 may electrically couple energy storage device 132 and power source 180. In some examples, power source 180 may be connected at inlet port 150. Furthermore, in some examples, a charge status indicator 151 may display a charge status of energy storage device 132.

In some examples, electrical energy from power source 180 may be received by charger 152. For example, charger 152 may convert alternating current from power source 180 to direct current (DC), for storage at energy storage device 132. Furthermore, a DC/DC converter 153 may convert a source of direct current from charger 152 from one voltage to another voltage. In other words, DC/DC converter 153 may act as a type of electric power converter.

While the vehicle propulsion system is operated to propel the vehicle, electrical transmission cable 182 may be disconnected between power source 180 and energy storage device 132. Control system 14 may identify and/or control the amount of electrical energy stored at the energy storage device, which may be referred to as the state of charge (SOC).

In other examples, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 132 from a power source that does not comprise part of the vehicle. In this way, electric machine 120 may propel the vehicle by utilizing an energy source other than the fuel utilized by engine 110.

Electric energy storage device 132 includes an electric energy storage device controller 139 and a power distribution module 138. Electric energy storage device controller 139 may provide charge balancing between energy storage element (e.g., battery cells) and communication with other vehicle controllers (e.g., controller 12). Power distribution module 138 controls flow of power into and out of electric energy storage device 132.

Vehicle propulsion system 100 may also include an ambient temperature/humidity sensor 198, and sensors dedicated to indicating the occupancy-state of the vehicle, for example onboard cameras 105, seat load cells 107, and door sensing technology 108. Vehicle system 100 may also include inertial sensors 199. Inertial sensors 199 may comprise one or more of the following: longitudinal, latitudinal, vertical, yaw, roll, and pitch sensors (e.g., accelerometers). Axes of yaw, pitch, roll, lateral acceleration, and longitudinal acceleration are as indicated. As one example, inertial sensors 199 may couple to the vehicle's restraint control module (RCM) (not shown), the RCM comprising a subsystem of control system 14. The control system may adjust engine output and/or the wheel brakes to increase vehicle stability in response to sensor(s) 199. In another example, the control system may adjust an active suspension system 111 responsive to input from inertial sensors 199. Active suspension system 111 may comprise an active suspension system having hydraulic, electrical, and/or mechanical devices, as well as active suspension systems that control the vehicle height on an individual corner basis (e.g., four corner independently controlled vehicle heights), on an axle-by-axle basis (e.g., front axle and rear axle vehicle heights), or a single vehicle height for the entire vehicle. Data from inertial sensor 199 may also be communicated to controller 12, or alternatively, sensors 199 may be electrically coupled to controller 12.

One or more tire pressure monitoring sensors (TPMS) may be coupled to one or more tires of wheels in the vehicle. For example, FIG. 1A shows a tire pressure sensor 197 coupled to wheel 131 and configured to monitor a pressure in a tire of wheel 131. While not explicitly illustrated, it may be understood that each of the four tires indicated in FIG. 1A may include one or more tire pressure sensor(s) 197. Furthermore, in some examples, vehicle propulsion system 100 may include a pneumatic control unit 123. Pneumatic control unit may receive information regarding tire pressure from tire pressure sensor(s) 197, and send said tire pressure information to control system 14. Based on said tire pressure information, control system 14 may command pneumatic control unit 123 to inflate or deflate tire(s) of the vehicle wheels. While not explicitly illustrated, it may be understood that pneumatic control unit 123 may be used to inflate or deflate tires associated with any of the four wheels illustrated in FIG. 1A. For example, responsive to an indication of a tire pressure decrease, control system 14 may command pneumatic control system unit 123 to inflate one or more tire(s). Alternatively, responsive to an indication of a tire pressure increase, control system 14 may command pneumatic control system unit 123 to deflate tire(s) one or more tires. In both examples, pneumatic control system unit 123 may be used to inflate or deflate tires to an optimal tire pressure rating for said tires, which may prolong tire life.

One or more wheel speed sensors (WSS) 195 may be coupled to one or more wheels of vehicle propulsion system 100. The wheel speed sensors may detect rotational speed of each wheel. Such an example of a WSS may include a permanent magnet type of sensor.

Vehicle propulsion system 100 may further include an accelerometer 20. Vehicle propulsion system 100 may further include an inclinometer 21.

Vehicle propulsion system 100 may further include a starter 140. Starter 140 may comprise an electric motor, hydraulic motor, etc., and may be used to rotate engine 110 so as to initiate engine 110 operation under its own power.

Vehicle propulsion system 100 may further include a brake system control module (BSCM) 141. In some examples, BSCM 141 may comprise an anti-lock braking system, such that wheels (e.g. 130, 131) may maintain tractive contact with the road surface according to driver inputs while braking, which may thus prevent the wheels from locking up, to prevent skidding. In some examples, BSCM may receive input from wheel speed sensors 195.

Vehicle propulsion system 100 may further include a belt integrated starter/generator (BISG) 142. BISG may produce electric power when the engine 110 is in operation, where the electrical power produced may be used to supply electric devices and/or to charge the onboard storage device 132. As indicated in FIG. 1A, a second inverter system controller (ISC2) 143 may receive alternating current from BISG 142, and may convert alternating current generated by BISG 142 to direct current for storage at energy storage device 132. Integrated starter/generator 142 may also provide torque to engine 110 during engine starting or other conditions to supplement engine torque.

In some examples, vehicle propulsion system 100 may include one or more electric machines 135a and 135b to propel vehicle 121 or to provide regenerative braking via front wheels 130. Third inverter (ISC3) 147a may convert alternating current generated by electric machine 135a to direct current for storage at the electric energy storage device 132 or provide alternating current to electric machine 135a to propel vehicle 121. Likewise, fourth inverter (ISC4) 147a may convert alternating current generated by electric machine 135b to direct current for storage at the electric energy storage device 132 or provide alternating current to electric machine 135b to propel vehicle 121. Electric machines 135a and 135b may be collectively referred to as front wheel electric machines. Alternatively, a single front wheel electric machine may drive and/or provide regenerative braking to both front wheels 130.

Vehicle propulsion system 100 may further include a power distribution box (PDB) 144. PDB 144 may be used for routing electrical power throughout various circuits and accessories in the vehicle's electrical system.

Vehicle propulsion system 100 may further include a high current fuse box (HCFB) 145, and may comprise a variety of fuses (not shown) used to protect the wiring and electrical components of vehicle propulsion system 100.

Vehicle propulsion system 100 may further include a motor electronics coolant pump (MECP) 146. MECP 146 may be used to circulate coolant to diffuse heat generated by at least electric machine 120 of vehicle propulsion system 100, and the electronics system. MECP may receive electrical power from onboard energy storage device 132, as an example.

Controller 12 may comprise a portion of a control system 14. In some examples, controller 12 may be a single controller of the vehicle. Control system 14 is shown receiving information from a plurality of sensors 16 (various examples of which are described herein) and sending control signals to a plurality of actuators 81 (various examples of which are described herein). As one example, sensors 16 may include tire pressure sensor(s) 197, wheel speed sensor(s) 195, ambient temperature/humidity sensor 198, onboard cameras 105, seat load cells 107, door sensing technology 108, inertial sensors 199, etc. In some examples, sensors associated with engine 110, transmission 125, electric machine 120, etc., may communicate information to controller 12, regarding various states of engine, transmission, and motor operation, as will be discussed in further detail with regard to FIG. 1B, FIG. 2 and FIG. 3.

Vehicle propulsion system 100 may further include a positive temperature coefficient (PTC) heater 148. As an example, PTC heater 148 may comprise a ceramic material such that when resistance is low, the ceramic material may accept a large amount of current, which may result in a rapid warming of the ceramic element. However, as the element warms and reaches a threshold temperature, the resistance may become very large, and as such, may not continue to produce much heat. As such, PTC heater 148 may be self-regulating, and may have a good degree of protection from overheating.

Vehicle propulsion system 100 may further include an air conditioning compressor module 149, for controlling an electric air conditioning compressor (not shown).

Vehicle propulsion system 100 may also include an on-board navigation system 17 (for example, a Global Positioning System) on dashboard 19 that an operator of the vehicle may interact with. The navigation system 17 may include one or more location sensors for assisting in estimating a location (e.g., geographical coordinates) of the vehicle. For example, on-board navigation system 17 may receive signals from GPS satellites (not shown), and from the signal identify the geographical location of the vehicle. In some examples, the geographical location coordinates may be communicated to controller 12.

Dashboard 19 may further include a display system 18 configured to display information to the vehicle operator. Display system 18 may comprise, as a non-limiting example, a touchscreen, or human machine interface (HMI), display which enables the vehicle operator to view graphical information as well as input commands. In some examples, display system 18 may be connected wirelessly to the internet (not shown) via controller (e.g. 12). As such, in some examples, the vehicle operator may communicate via display system 18 with an internet site or software application (app).

Dashboard 19 may further include an operator interface 15 via which the vehicle operator may adjust the operating status of the vehicle. Specifically, the operator interface 15 may be configured to initiate and/or terminate operation of the vehicle driveline (e.g., engine 110, BISG 142, DCT 125, and electric machines 120, 135*a*, and 135*b*) based on an operator input. Various examples of the operator ignition interface 15 may include interfaces that require a physical apparatus, such as an active key, that may be inserted into the operator ignition interface 15 to start the engine 110 and turn on the vehicle, or may be removed to shut down the engine 110 and turn off the vehicle. Other examples may include a passive key that is communicatively coupled to the operator ignition interface 15. The passive key may be configured as an electronic key fob or a smart key that does not have to be inserted or removed from the ignition interface 15 to operate the vehicle engine 110. Rather, the passive key may need to be located inside or proximate to the vehicle (e.g., within a threshold distance of the vehicle). Still other examples may additionally or optionally use a start/stop button that is manually pressed by the operator to start or shut down the engine 110 and turn the vehicle on or off. In other examples, a remote engine start may be initiated remote computing device (not shown), for example a cellular telephone, or smartphone-based system where a user's cellular telephone sends data to a server and the server communicates with the vehicle controller 12 to start the engine.

Figure 1B:
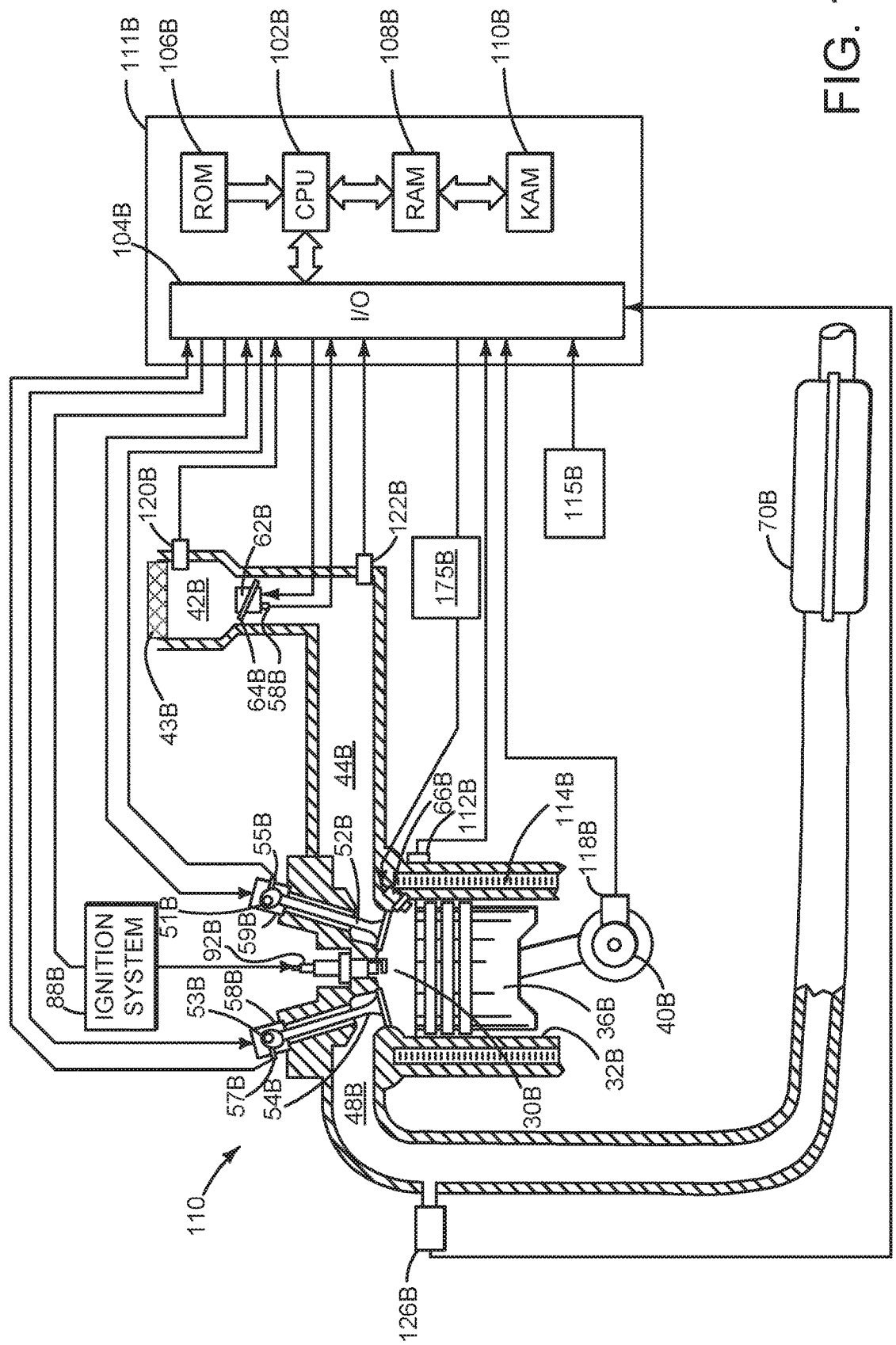
FIG. 1B is a sketch of an engine of the hybrid vehicle driveline.

Referring to FIG. 1B, a detailed view of internal combustion engine 110, comprising a plurality of cylinders, one cylinder of which is shown in FIG. 1B, is shown. Engine 110 is controlled by electronic engine controller 111B. Engine 110 includes combustion chamber 30B and cylinder walls 32B with piston 36B positioned therein and connected to crankshaft 40B. Combustion chamber 30B is shown communicating with intake manifold 44B and exhaust manifold 48B via respective intake valve 52B and exhaust valve 54B. Each intake and exhaust valve may be operated by an intake cam 51B and an exhaust cam 53B. The position of intake cam 51B may be determined by intake cam sensor 55B. The position of exhaust cam 53B may be determined by exhaust cam sensor 57B. Intake cam 51B and exhaust cam 53B may be moved relative to crankshaft 40B. Intake valves may be deactivated and held in a closed state via intake valve deactivating mechanism 59B. Exhaust valves may be deactivated and held in a closed state via exhaust valve deactivating mechanism 58B.

Fuel injector 66B is shown positioned to inject fuel directly into cylinder 30B, which is known to those skilled in the art as direct injection. Alternatively, fuel may be injected to an intake port, which is known to those skilled in the art as port injection. Fuel injector 66B delivers liquid fuel in proportion to the pulse width of signal from engine controller 111B. Fuel is delivered to fuel injector 66B by a fuel system 175B, which includes a tank and pump. In addition, intake manifold 44B is shown communicating with optional electronic throttle 62B (e.g., a butterfly valve) which adjusts a position of throttle plate 64B to control air flow from air filter 43B and air intake 42B to intake manifold 44B. Throttle 62B regulates air flow from air filter 43B in engine air intake 42B to intake manifold 44B. In some examples, throttle 62B and throttle plate 64B may be positioned between intake valve 52B and intake manifold 44B such that throttle 62B is a port throttle.

Distributorless ignition system 88B provides an ignition spark to combustion chamber 30B via spark plug 92B in response to engine controller 111B. Universal Exhaust Gas Oxygen (UEGO) sensor 126B is shown coupled to exhaust manifold 48B upstream of catalytic converter 70B in a direction of exhaust flow. Alternatively, a two-state exhaust gas oxygen sensor may be substituted for UEGO sensor 126B.

Converter 70B can include multiple catalyst bricks, in one example. In another example, multiple emission control devices, each with multiple bricks, can be used. Converter 70B can be a three-way type catalyst in one example.

Engine controller 111B is shown in FIG. 1B as a conventional microcomputer including: microprocessor unit 102B, input/output ports 104B, read-only memory 106B (e.g., non-transitory memory), random access memory 108B, keep alive memory 110B, and a conventional data bus. Other controllers mentioned herein may have a similar processor and memory configuration. Engine controller 111B is shown receiving various signals from sensors coupled to engine 110, in addition to those signals previously discussed, including: engine coolant temperature (ECT) from temperature sensor 112B coupled to cooling sleeve 114B; a measurement of engine manifold pressure (MAP) from pressure sensor 122B coupled to intake manifold 44B; an engine position sensor from a Hall effect sensor 118B sensing crankshaft 40B position; a measurement of air mass entering the engine from sensor 120B; and a measurement of throttle position from sensor 58B. Barometric pressure may also be sensed (sensor not shown) for processing by engine controller 111B. In a preferred aspect of the present description, engine position sensor 118B produces a predetermined number of equally spaced pulses every revolution of the crankshaft from which engine speed (RPM) can be determined. Engine controller 111B may receive input from human/machine interface 115B (e.g., pushbutton or touch screen display).

During operation, each cylinder within engine 110 typically undergoes a four stroke cycle: the cycle includes the intake stroke, compression stroke, expansion stroke, and exhaust stroke. During the intake stroke, generally, the exhaust valve 54B closes and intake valve 52B opens. Air is introduced into combustion chamber 30B via intake manifold 44B, and piston 36B moves to the bottom of the cylinder so as to increase the volume within combustion chamber 30B. The position at which piston 36B is near the bottom of the cylinder and at the end of its stroke (e.g. when combustion chamber 30B is at its largest volume) is typically referred to by those of skill in the art as bottom dead center (BDC). During the compression stroke, intake valve 52B and exhaust valve 54B are closed. Piston 36B moves toward the cylinder head so as to compress the air within combustion chamber 30B. The point at which piston 36B is at the end of its stroke and closest to the cylinder head (e.g. when combustion chamber 30B is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92B, resulting in combustion. During the expansion stroke, the expanding gases push piston 36B back to BDC. Crankshaft 40B converts piston movement into a rotational torque of the rotary shaft. Finally, during the exhaust stroke, the exhaust valve 54B opens to release the combusted air-fuel mixture to exhaust manifold 48B and the piston returns to TDC. Note that the above is shown merely as an example, and that intake and exhaust valve opening and/or closing timings may vary, such as to provide positive or negative valve overlap, late intake valve closing, or various other examples.

Figure 2:
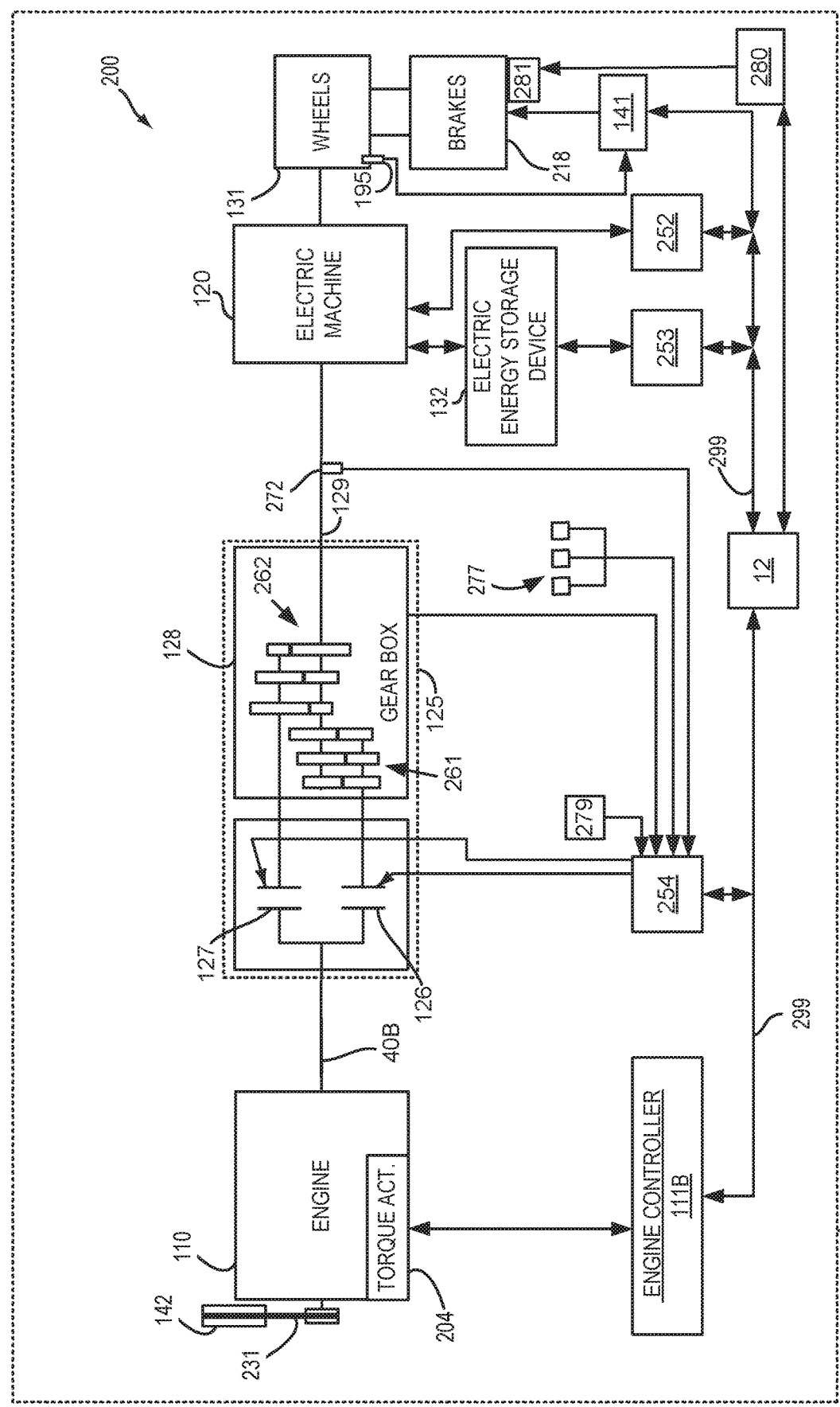
FIG. 2 is a schematic diagram of the hybrid vehicle driveline including controllers of various driveline components.

FIG. 2 is a block diagram of vehicle 121 including a powertrain or driveline 200. The powertrain of FIG. 2 includes engine 110 shown in FIG. 1A-1B. Other components of FIG. 2 that are common with FIG. 1A are indicated by like numerals, and will be discussed in detail below. Powertrain 200 is shown including vehicle system controller 12, engine controller 111B, electric machine controller 252, transmission controller 254, energy storage device controller 253, and brake controller 141 (also referred to herein as brake system control module). The controllers may communicate over controller area network (CAN) 299. Each of the controllers may provide information to other controllers such as torque output limits (e.g. torque output of the device or component being controlled not to be exceeded), torque input limits (e.g. torque input of the device or component being controlled not to be exceeded), torque output of the device being controlled, sensor an actuator data, diagnostic information (e.g. information regarding a degraded transmission, information regarding a degraded engine, information regarding a degraded electric machine, information regarding degraded brakes). Further, the vehicle system controller 12 may provide commands to engine controller 111B, electric machine controller 252, transmission controller 254, and brake controller 141 to achieve driver input requests and other requests that are based on vehicle operating conditions.

For example, in response to a driver releasing an accelerator pedal and vehicle speed decreasing, vehicle system controller 12 may request a desired wheel torque or wheel power level to provide a desired rate of vehicle deceleration. The desired wheel torque may be provided by vehicle system controller 12 requesting a first braking torque from electric machine controller 252 and a second braking torque from brake controller 141, the first and second torques providing the desired braking torque at vehicle wheels 131.

In other examples, the partitioning of controlling powertrain devices may be partitioned differently than is illustrated in FIG. 2. For example, a single controller may take the place of vehicle system controller 12, engine controller 111B, electric machine controller 252, transmission controller 254, and brake controller 141. Alternatively, the vehicle system controller 12 and the engine controller 111B may be a single unit while the electric machine controller 252, the transmission controller 254, and the brake controller 141 may be standalone controllers.

In this example, powertrain 200 may be powered by engine 110 and electric machine 120. In other examples, engine 110 may be omitted. Engine 110 may be started with an engine starter (e.g. 140), via belt integrated starter/generator (BISG) 142, or via electric machine 120. In some examples, BISG 142 may be coupled directly to the engine crankshaft at either end (e.g., front or back) of the crankshaft. Electric machine 120 (e.g. high voltage electric machine, operated with greater than 30 volts), is also referred to herein as electric machine, motor, and/or generator. Further, torque of engine 110 may be adjusted via a torque actuator 204, such as a fuel injector, throttle, etc.

BISG 142 is mechanically coupled to engine 110 via belt 231. BISG 142 may be coupled to a crankshaft (not shown) or a camshaft (not shown). BISG 142 may operate as a motor when supplied with electrical power via electric energy storage device 132, also referred to herein as onboard energy storage device 132. BISG 142 may additionally operate as a generator supplying electrical power to electric energy storage device 132.

Driveline 200 includes engine 110 mechanically coupled to dual clutch transmission (DCT) 125 via crank shaft 40B. DCT 125 includes a first clutch 126, a second clutch 127, and a gear box 128. DCT 125 outputs torque to shaft 129, to supply torque to vehicle wheels 131. Transmission controller 254 selectively opens and closes first clutch 126 and second clutch 127 to shift DCT 125.

Gear box 128 may include a plurality of gears. One clutch, for example first clutch 126 may control odd gears 261 (e.g. first, third, fifth, and reverse), while another clutch, for example second clutch 127, may control even gears 262 (e.g. second, fourth, and sixth). By utilizing such an arrangement, gears can be changed without interrupting power flow from the engine 110 to dual clutch transmission 125.

Electric machine 120 may be operated to provide torque to powertrain 200 or to convert powertrain torque into electrical energy to be stored in electrical energy storage device 132 in a regeneration mode. Additionally, electric machine 120 may convert the vehicle's kinetic energy into electrical energy for storage in electric energy storage device 132. Electric machine 120 is in electrical communication with energy storage device 132. Electric machine 120 has a higher output torque capacity than starter (e.g. 140) depicted in FIG. 1A, or BISG 142. Further, electric machine 120 directly drives powertrain 200, or is directly driven by powertrain 200.

Electrical energy storage device 132 (e.g. high voltage battery or power source) may be a battery, capacitor, or inductor. Electric machine 120 is mechanically coupled to wheels 131 and dual clutch transmission via a gear set in rear drive unit 136 (shown in FIG. 1A). Electric machine 120 may provide a positive torque or a negative torque to powertrain 200 via operating as a motor or generator as instructed by electric machine controller 252.

Further, a frictional force may be applied to wheels 131 by engaging friction wheel brakes 218. In one example, friction wheel brakes 218 may be engaged in response to the driver pressing his foot on a brake pedal (e.g. 192) and/or in response to instructions within brake controller 141. Further, brake controller 141 may apply brakes 218 in response to information and/or requests made by vehicle system controller 12. In the same way, a frictional force may be reduced to wheels 131 by disengaging wheel brakes 218 in response to the driver releasing his foot from a brake pedal, brake controller instructions, and/or vehicle system controller instructions and/or information. For example, vehicle brakes may apply a frictional force to wheels 131 via controller 141 as part of an automated engine stopping procedure.

Vehicle system controller 12 may also communicate vehicle suspension settings to suspension controller 280. The suspension (e.g. 111) of vehicle 121 may be adjusted to critically damp, over damp, or under damp the vehicle suspension via variable dampeners 281.

Accordingly, torque control of the various powertrain components may be supervised by vehicle system controller 12 with local torque control for the engine 110, transmission 125, electric machine 120, and brakes 218 provided via engine controller 111B, electric machine controller 252, transmission controller 254, and brake controller 141.

As one example, an engine torque output may be controlled by adjusting a combination of spark timing, fuel pulse width, fuel pulse timing, and/or air charge, by controlling throttle (e.g. 62B) opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Electric machine controller 252 may control torque output and electrical energy production from electric machine 120 by adjusting current flowing to and from field and/or armature windings of electric machine 120 as is known in the art.

Transmission controller 254 may receive transmission output shaft torque from torque sensor 272. Alternatively, sensor 272 may be a position sensor or torque and position sensors. If sensor 272 is a position sensor, transmission controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 111B, and vehicle system controller 12, may also receive additional transmission information from sensors 277, which may include but are not limited to pump output line pressure sensors, transmission hydraulic pressure sensors (e.g., gear clutch fluid pressure sensors), motor temperature sensors, BISG temperatures, shift selector position sensors, synchronizer position sensors, and ambient temperature sensors. Transmission controller may also receive a requested transmission state (e.g., requested gear or park mode) from shift selector 279, which may be a lever, switches, or other device.

Brake controller 141 receives wheel speed information via wheel speed sensor 195 and braking requests from vehicle system controller 12. Brake controller 141 may also receive brake pedal position information from brake pedal sensor (e.g. 157) shown in FIG. 1A directly or over CAN 299. Brake controller 141 may provide braking responsive to a wheel torque command from vehicle system controller 12. Brake controller 141 may also provide anti-lock and vehicle stability braking to improve vehicle braking and stability. As such, brake controller 141 may provide a wheel torque limit (e.g., a threshold negative wheel torque not to be exceeded) to the vehicle system controller 12 so that negative motor torque does not cause the wheel torque limit to be exceeded. For example, if controller 12 issues a negative wheel torque limit of 50 N-m, motor torque may be adjusted to provide less than 50 N-m (e.g., 49 N-m) of negative torque at the wheels, including accounting for transmission gearing.

Positive torque may be transmitted to vehicle wheels 131 in a direction starting at engine 110 and ending at wheels 131. Thus, according to the direction of positive torque flow in driveline 200, engine 110 is positioned in driveline 200 upstream of transmission 125. Transmission 125 is positioned upstream of electric machine 120, and BISG 142 may be positioned upstream of engine 110, or downstream of engine 110 and upstream of transmission 125.

Figure 3:
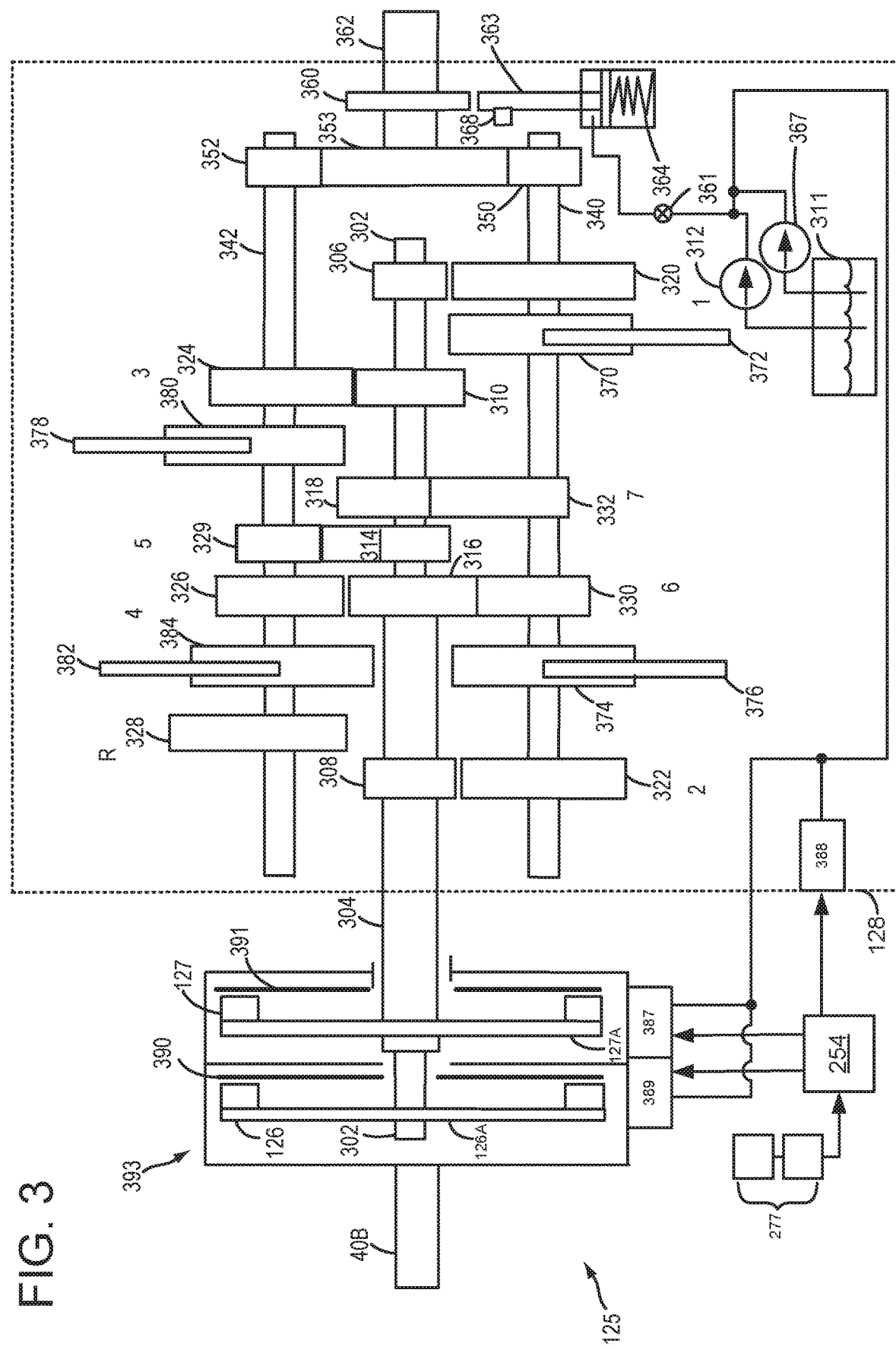
FIG. 3 is a schematic diagram of a dual clutch transmission located in the hybrid vehicle driveline.

FIG. 3 shows a detailed illustration of a dual clutch transmission (DCT) 125. Engine crankshaft 40B is illustrated as coupling to a clutch housing 393. Alternatively, a shaft may couple crankshaft 40B to clutch housing 393. Clutch housing 393 may spin in accordance with rotation of crankshaft 40B. Clutch housing 393 may include a first clutch 126 and a second clutch 127. Furthermore, each of first clutch 126 and second clutch 127 have an associated first clutch plate 390, and a second clutch plate 391, respectively. In some examples, the clutches may comprise wet clutches, bathed in oil (for cooling), or dry plate clutches. Engine torque may be transferred from clutch housing 393 to either first clutch 126 or second clutch 127. First transmission clutch 126 transfers torque between engine 110 (shown in FIG. 1A) and first transmission input shaft 302. As such, clutch housing 393 may be referred to as an input side of first transmission clutch 126 and 126A may be referred to as an output side of first transmission clutch 126. Second transmission clutch 127 transfers torque between engine 110 (shown in FIG. 1A) and second transmission input shaft 304. As such, clutch housing 393 may be referred to as an input side of second transmission clutch 127 and 127A may be referred to as an output side of second transmission clutch 127.

A gear box 128 may include a plurality of gears, as discussed above. There are two transmission input shafts, including first transmission input shaft 302, and second transmission input shaft 304. Second transmission input shaft 304 is hollow, while first transmission input shaft 302 is solid, and sits coaxially within the second transmission input shaft 304. As an example, first transmission input shaft 302 may have a plurality of fixed gears. For example, first transmission input shaft 302 may include first fixed gear 306 for receiving first gear 320, third fixed gear 310 for receiving third gear 324, fifth fixed gear 314 for receiving fifth gear 329, and seventh fixed gear 318 for receiving seventh gear 332. In other words, first transmission input shaft 302 may be selectively coupled to a plurality of odd gears. Second transmission input shaft 304 may include second fixed gear 308 for receiving second gear 322, or a reverse gear 328, and may further include fourth fixed gear 316, for receiving either fourth gear 326 or sixth gear 330. It may be understood that both first transmission input shaft 302 and second transmission input shaft 304 may be connected to each of first clutch 126 and second clutch 127 via spines (not shown) on the outside of each shaft, respectively. In a normal resting state, each of first clutch 302 and second clutch 304 are held open, for example via springs (not shown), etc., such that no torque from engine (e.g. 110) may be transmitted to first transmission input shaft 302 or second transmission input shaft 304 when each of the respective clutches are in an open state. Responsive to closing first clutch 126, engine torque may be transmitted to first transmission input shaft 302, and responsive to closing second clutch 127, engine torque may be transmitted to second transmission input shaft 304. During normal operation, transmission electronics may ensure that only one clutch is closed at any given time.

Gear box 128 may further include a first layshaft shaft 340, and second layshaft shaft 342. Gears on first layshaft shaft 340 and second layshaft shaft 342 are not fixed, but may freely rotate. In example DCT 125, first layshaft shaft 340 includes first gear 320, second gear 322, sixth gear 330, and seventh gear 332. Second layshaft shaft 342 includes third gear 324, fourth gear 326, fifth gear 329, and reverse gear 328. Both first layshaft shaft 340 and second layshaft shaft 342 may transfer torque via a first output pinion 350, and a second output pinion 352, respectively, to gear 353. In this way, both layshafts may transfer torque via each of first output pinion 350 and second output pinion 352, to output shaft 362, where output shaft may transfer torque to a rear drive unit 136 (shown in FIG. 1A) which may enable each of the driven wheels (e.g. 131 of FIG. 1A) to rotate at different speeds, for example when performing turning maneuvers.

As discussed above, each of first gear 320, second gear 322, third gear 324, fourth gear 326, fifth gear 329, sixth gear 330, seventh gear 332, and reverse gear 328 are not fixed to layshafts (e.g. 340 and 342), but instead may freely rotate. As such, synchronizers may be utilized to enable each of the gears to match the speed of the layshafts, and may further be utilized to lock the gears. In example DCT 125, four synchronizers are illustrated, for example, first synchronizer 370, second synchronizer 374, third synchronizer 380, and fourth synchronizer 382. First synchronizer 370 includes corresponding first selector fork 372, second synchronizer 374 includes corresponding selector fork 376, third synchronizer 380 includes corresponding third selector fork 378, and fourth synchronizer 384 includes corresponding fourth selector fork 382. Each of the selector forks may enable movement of each corresponding synchronizer to lock one or more gears, or to unlock one or more gears. For example, first synchronizer 370 may be utilized to lock either first gear 320 or seventh gear 332. Second synchronizer 374 may be utilized to lock either second gear 322 or sixth gear 330. Third synchronizer 380 may be utilized to lock either third gear 324 or fifth gear 329. Fourth synchronizer 384 may be utilized to lock either fifth gear 326, or reverse gear 328. In each case, movement of the synchronizers may be accomplished via the selector forks (e.g. 372, 376, 378, and 382) moving each of the respective synchronizers to the desired position.

Movement of synchronizers via selector forks may be carried out via transmission control module (TCM) 254 and shift fork actuators 388, where TCM 254 may comprise TCM 254 discussed above with regard to FIG. 2. Shift fork actuators may be operated electrically, hydraulically, or a combination of electric and hydraulic. Hydraulic power may be provided via pump 312 and/or pump 367. TCM 254 may collect input signals from various sensors, assess the input, and control various actuators accordingly. Inputs utilized by TCM 254 may include but are not limited to transmission range (P/R/N/D/S/L, etc.), vehicle speed, engine speed and torque, throttle position, engine temperature, ambient temperature, steering angle, brake inputs, gear box input shaft speed (for both first transmission input shaft 302 and second transmission input shaft 304), vehicle attitude (tilt). The TCM may control actuators via an open-loop control, to allow for adaptive control. For example, adaptive control may enable TCM 254 to identify and adapt to clutch engagement points, clutch friction coefficients, and position of synchronizer assemblies. TCM 254 may also adjust first clutch actuator 389 and second clutch actuator 387 to open and close first clutch 126 and second clutch 127. First clutch actuator 389 and second clutch actuator 387 may be operated electrically, hydraulically, or a combination of electric and hydraulic. Hydraulic power may be provided via pump 312 and/or pump 367.

As such TCM 254 is illustrated as receiving input from various sensors 277. As discussed above with regard to FIG. 2, the various sensors may include pump output line pressure sensors, transmission hydraulic pressure sensors (e.g. gear clutch fluid pressure sensors), motor temperature sensors, shifter position sensors, synchronizer position sensors, and ambient temperature sensors. The various sensors 277 may further include wheel speed sensors (e.g. 195), engine speed sensors, engine torque sensors, throttle position sensors, engine temperature sensors, steering angle sensors, transmission fork position sensors for detecting positions of selector forks (e.g. 372, 376, 378, 382), and inertial sensors (e.g. 199). Inertial sensors may comprise one or more of the following: longitudinal, latitudinal, vertical, yaw, roll, and pitch sensors, as discussed above with regard to FIG. 1A.

Sensors 277 may further include an input shaft speed (ISS) sensor, which may include a magneto-resistive sensor, and where one ISS sensor may be included for each gear box input shaft (e.g. one for first transmission input shaft 302 and one for second transmission input shaft 304). Sensors 277 may further include an output shaft speed sensor (OSS), which may include a magneto-resistive sensor, and may be attached to output shaft 362. Sensors 277 may further include a transmission range (TR) sensor.

DCT 125 may be understood to function as described herein. For example, when first clutch 126 is actuated closed, engine torque may be supplied to first transmission input shaft 302. When first clutch 126 is closed, it may be understood that second clutch 127 is open, and vice versa. Depending on which gear is locked when first clutch 126 is closed, power may be transmitted via the first transmission input shaft 302 to either first layshaft 340 or second layshaft 342, and may be further transmitted to output shaft 362 via either first pinion gear 350 or second pinion gear 352. Alternatively, when second clutch 127 is closed, power may be transmitted via the second transmission input shaft 304 to either first layshaft 340 or second layshaft 342, depending on which gear is locked, and may be further transmitted to output shaft 362 via either first pinion gear 350 or second pinion gear 352. It may be understood that when torque is being transferred to one layshaft (e.g. first output shaft 340), the other layshaft (e.g. second output shaft 342) may continue to rotate even though only the one shaft is driven directly by the input. More specifically, the non-engaged shaft (e.g. second layshaft 342) may continue to rotate as it is driven indirectly by the output shaft 362 and respective pinion gear (e.g. 352).

DCT 125 may enable preselection of gears, which may thus enable rapid switching between gears with minimal loss of torque during shifting. As an example, when first gear 320 is locked via first synchronizer 340, and wherein first clutch 126 is closed (and second clutch 127 is open), power may be transmitted from the engine to first input shaft 302, and to first layshaft 340. While first gear 320 is engaged, second gear 322 may simultaneously be locked via second synchronizer 374. Because second gear 322 is locked, this may rotate second input shaft 304, where the second input shaft 304 is speed matched to the vehicle speed in second gear. In an alternative case where a gear is pre-selected on the other layshaft (e.g. second layshaft 342), that layshaft will also rotate as it is driven by output shaft 362 and pinion 352.

When a gear shift is initiated by TCM 254, only the clutches need to be actuated to open first clutch 126 and close second clutch 127. Furthermore, outside the TCM, engine speed may be lowered to match the upshift. With the second clutch 127 closed, power may be transmitted from the engine, to second input shaft 304, and to first layshaft 340, and may be further transmitted to output shaft 362 via pinion 350. Subsequent to the shifting of gears being completed, TCM 254 may pre-select the next gear appropriately. For example, TCM 254 may pre-select either a higher or a lower gear, based on input it receives from various sensors 277. In this way, gear changes may be achieved rapidly with minimal loss of engine torque provided to the output shaft 362.

Dual clutch transmission 300 may in some examples include a parking gear 360. A parking pawl 363 may face parking gear 360. When a shift lever is set to park, park pawl 363 may engage parking gear 360. Engagement of parking pawl 363 with parking gear 360 may be accomplished via a parking pawl spring 364, or may be achieved via a cable (not shown), a hydraulic piston (not shown) or a motor (not shown), for example. When parking pawl 363 is engaged with parking gear 360, driving wheels (e.g. 130, 131) of a vehicle may be locked. On the other hand, responsive to the shift lever being moved from park, to another selection (e.g. drive), parking pawl 363 may move such that parking pawl 363 may be disengaged from parking gear 360.

In some examples, an electric transmission pump 312 may supply hydraulic fluid from transmission sump 311 to compress spring 364, in order to release parking pawl 363 from parking gear 360. Electric transmission pump 312 may be powered by an onboard energy storage device (e.g. 132), for example. In some examples, a mechanical pump 367 may additionally or alternatively supply hydraulic fluid from transmission sump 311 to compress spring 364 to release parking pawl 363 from parking gear 360. While not explicitly illustrated, mechanical pump may be driven by the engine (e.g. 110), and may be mechanically coupled to clutch housing 393. A park pawl valve 361 may regulate the flow of hydraulic fluid to spring 364, in some examples.

Referring now to FIG. 4, an example method for operating a hybrid driveline to improve transmission gear shifting is shown. The method of FIG. 4 may be incorporated into and may cooperate with the system of FIGS. 1A-3. Further, at least portions of the method of FIG. 4 may be incorporated as executable instructions stored in non-transitory memory while other portions of the method may be performed via a controller transforming operating states of devices and actuators in the physical world.

At 402, method 400 determines a desired transmission gear. In one example, method 400 determines a desired transmission gear in response to vehicle speed and accelerator pedal position or a demanded wheel torque determined from accelerator pedal position. In particular, method 400 indexes a transmission shift schedule stored in controller memory. The transmission shift schedule may be a table or function that holds empirically determined transmission gears. The vehicle speed and accelerator pedal position index memory locations in the table or function and the table or function outputs the desired transmission gear. Method 400 proceeds to 404 after determining the desired transmission gear.

At 404, method 400 judges if a power-on upshift is requested. A power-on upshift is a gear shift from a lower gear (e.g., $1^{st}$ gear) to a higher gear (e.g., $2^{nd}$ gear) while driver demand torque is greater than zero. The driver demand torque is greater than zero when the accelerator pedal is applied or depressed. A power-on upshift may be requested when the desired gear changes from a lower gear to a higher gear (e.g., shifts from $2^{nd}$ gear to $3^{rd}$ gear) when the accelerator pedal is applied. If method 400 judges that a power-on upshift is requested, the answer is yes and method 400 proceeds to 406. Otherwise, the answer is no and method 400 proceeds to 440.

At 440, method 400 determines and commands a desired engine torque reserve that may be used during gear shifting. The desired engine torque reserve may be used to increase engine torque during a portion of a transmission gear shift where the torque ratio of the transmission is changing so that constant or substantially constant vehicle acceleration (e.g., 95-100% of vehicle acceleration immediately before the gear shift began) may be provided during transmission gear shifting. The desired engine torque reserve may be provided via retarding engine spark timing from minimum spark timing for best engine torque (MBT) or borderline knock spark timing (BDL). The amount of torque between the engine operating at the retarded spark timing and the amount of torque while operating the engine at MBT or BDL spark timing is the amount of torque reserve. If it is desired to increase engine torque during a gear shift, spark timing may be advanced to increase engine output torque. In one example, the amount of torque reserve may be empirically determined and stored to a table or function in controller memory. The table or function may be indexed via engine speed and engine load or driver demanded engine torque. The torque reserve may then be converted into a spark retard amount that is commanded. Advancing spark timing may increase engine torque faster than increasing an engine air amount and fuel amount for at least the reason that spark timing for a cylinder may be advanced even after air and fuel have been inducted into a cylinder. Consequently, adjusting spark timing may improve engine torque response faster than increasing engine air flow and fuel flow. An amount of air that is inducted to the engine may be increased to compensate for the torque reduction due to retarding spark timing while spark timing is being retarded. Method 400 proceeds to exit after commanding the engine to retarded spark timing so that an engine torque reserve may be provided.

At 406, method 400 judges if the torque transfer phase of the gear shift is active. A power-on transmission gear upshift may be comprised of two phases. The first phase is a torque phase or a torque transfer phase and it is a time during the gear shift where the off-going clutch is opening, but still transferring torque, and the on-coming clutch is closing and beginning to transfer torque. For the dual clutch transmission shown in FIG. 3, the on-coming clutch may be clutch 126 or clutch 127. The off-going clutch may be clutch 126 or clutch 127. For example, the off-going clutch for a particular gear shift may be clutch 126 and the on-coming clutch may be clutch 127. The second phase of the transmission gear shift is an inertia phase and it begins when the off-going clutch stops transferring torque while the on-coming clutch continues to close and transfer torque. The shift ends when the on-coming clutch is fully closed and there is substantially zero slip (e.g., less than 30 RPM speed difference from the input side of the clutch to the output side of the clutch). In one example, method 400 determines if the torque phase is active in response to a time since the off-going clutch release began and a time since on-coming clutch application began. For example, method 400 may include empirically determined timing values for torque phase and inertia phases for each transmission gear shift (e.g., $1^{st}$ to $2^{nd}$ gear, $2^{nd}$ to $3^{rd}$ gear, etc.).

Additionally, the torque and inertia phase times of a transmission gear shift may be adapted. If the time from the beginning of the transmission gear shift indicates that the transmission gear shift is in a torque transfer phase, the answer is yes and method 400 proceeds to 408. Otherwise, the answer is no and method 400 proceeds to 450.

At 450, method 400 adjusts clutch capacity of the on-coming clutch and transmission input torque during the inertia phase of the power-on upshift. During the inertia phase of the power-on upshift, the speed of the transmission input may be decreased via decreasing the transmission input torque. The torque transmitted through the transmission may be governed by the capacity of the clutch because the on-coming clutch is slipping during the inertia phase. Regardless of the whether the torque hole fill request was achieved with the engine, integrated starter/generator, front wheel electric machines, or the rear drive unit electric machine, the on-coming clutch torque capacity may be determined as a function the reported ratio change according to the following equation:

$$Tq_{on\_clth\_cap} = \frac{RT_{reported}}{RT_{gear\_new}} \cdot Tq_{Tm\_wo\_mod}$$

where $Tq_{on\_clth\_cap}$ is the torque capacity of the on-coming clutch, $RT_{reported}$ is the reported transmission torque ratio as determined via dividing output speed of the transmission by input speed of the transmission, $RT_{gear\_new}$ is the torque ratio of the transmission when the transmission is engaged in the new gear, and $Tq_{Tm\_wo\_mod}$ is the transmission input torque without modification.

The transmission input torque may be adjusted to a value equal to or less than a transmission maximum instantaneous torque limit as determined via the following equation:

$$Tq_{Tm\_inst\_max} = \frac{1}{2} \cdot \left( Tq_{Tm\_in\_newgear} + \frac{RT_{gear\_old}}{RT_{gear\_new}} \cdot Tq_{Tm\_in\_oldgear} \right) - J_{Tm\_in} \cdot \omega_{Tm\_out} \cdot \left( \frac{RT_{gear\_old} - RT_{gear\_new}}{T_{shft\_dur}} \right)$$

where $Tq_{Tm\_inst\_max}$ is the transmission input maximum instantaneous torque limit, $Tq_{Tm\_in\_newgear}$ is the transmission input torque in the new gear immediately after the on-coming clutch fully closes, $RT_{gear\_new}$ is the torque ratio of the transmission while engaged in the new gear, $RT_{gear\_old}$ is the torque ratio of the transmission while engaged in the old gear, $Tq_{Tm\_in\_oldgear}$ is the transmission input torque in the old gear immediately before the off-going clutch begins to be released during the present gear shift, $J_{Tm\_in}$ is the transmission effective input inertia, $\omega_{Tm\_out}$ is the transmission output shaft angular speed, and $T_{shft\_dur}$ is the duration of the shift or gear ratio change. The value of $Tq_{Tm\_in\_newgear}$ is determined before the new gear is entered and it is based on the transmission input torque immediately before the gear shift and the new gear as described in detail at step 710 below. $Tq_{Tm\_inst\_max}$ may also be referred to as transmission input instantaneous upper torque threshold.

Method 400 may adjust the on-coming clutch torque capacity via applying a hydraulic, electric, or mechanically derived force to the on-coming clutch. Method 400 may adjust transmission input torque via adjusting a torque actuator of an engine and/or a torque actuator or an integrated starter/generator. The on-coming clutch torque capacity and the transmission input torque during the inertia phase of the power-on upshift may follow the trajectories shown in FIGS. 5 and 6. Method 400 proceeds to exit.

At 408, method 400 determines transmission input torque without transmission modification. As previously discussed, the vehicle system controller may receive various inputs for requesting braking torque and torque to accelerate the vehicle. For example, the torque to accelerate the vehicle may be input through an accelerator pedal or via an interface with an autonomous driver. In one example, the torque to accelerate the vehicle is a wheel torque that is determined from vehicle speed and accelerator pedal position or a voltage. Specifically, vehicle speed and accelerator pedal position are inputs to a table or function, and the table or function outputs a driver demand wheel torque from a plurality of empirically determined values stored in the table or function. The wheel torque may then be split or partitioned into a driver demand engine torque, driver demand integrated starter/generator torque (if present), and driver demand rear drive unit electric machine torque. The driver demand engine torque, driver demand integrated starter/generator torque, and driver demand rear drive unit electric machine torque may be partitioned in response to battery state of charge (SOC), integrated starter/generator temperature, rear drive unit electric machine temperature, and other vehicle conditions. For example, if SOC is high and driver demand wheel torque is low, driver demand engine torque and driver demand integrated starter/generator torque may be zero while driver demand rear drive unit electric machine torque provides the driver demand wheel torque. If SOC is low and driver demand is medium, driver demand rear drive unit electric machine torque and driver demand integrated starter/generator torque may be zero while driver demand engine torque provides the driver demand wheel torque.

The driver demand engine torque adjusted for transmission gear ratio and rear drive unit gear ratios, plus the driver demand integrated starter/generator torque adjusted for transmission gear ratio and rear drive unit gear ratios, plus the driver demand rear drive unit electric machine torque adjusted for rear drive unit gear ratios, sum to the driver demand wheel torque when the transmission is engaged in a gear.

The driver demand engine torque and/or integrated starter/generator torque (if present) may be modified for transmission clutch slippage, instantaneous transmission torque limits, transmission hardware torque limits, and other transmission conditions so that the desired wheel torque may be provided. For example during the torque transfer phase, power is dissipated through a slipping clutch so transmission assembly input torque may be temporarily increased to deliver a consistent transmission assembly output torque. The desired value of engine torque during these conditions plus torque of the integrated starter/generator prior to temporary modification may be referred to as transmission input torque without torque modification. The summed driver demand engine torque and driver demand integrated starter/generator torque determined from the driver demand wheel torque without the modifications for transmission clutch slippage, instantaneous transmission torque limits, transmission hardware torque limits, and other transmission conditions is transmission input torque without modification. Method 400 proceeds to 410 after determining the transmission input torque without modification.

At 410, method 400 estimates the actual transmission input torque. The actual transmission input torque can be defined as the sum of the estimated engine torque and the estimated integrated starter/generator torque. As discussed at step 408, a driver demand engine torque and/or integrated starter/generator torque may be modified from an unmodified driver demand engine torque and/or integrated starter/generator torque value originally derived from driver demand wheel torque for transmission clutch slippage and other driveline conditions. For example, if one of two clutches participating in a gear shift is slipping more or less than expected, engine and/or integrated starter/generator torque may be adjusted as a function of clutch slippage so that the desired wheel torque may be provided. In such a case, the delivered transmission assembly input torque will differ from the transmission assembly input torque without transmission modification. Method 400 proceeds to 412 after determining the estimated transmission input torque.

At 412, method 400 determines a desired torque transfer phase duration of the power-on gear ratio change duration. The desired torque transfer phase duration, or the duration (e.g., amount of time) for a torque transfer phase a gear shift to occur, may be empirically determined and stored in controller memory. In particular, the desired torque transfer phase duration values may be empirically determined and stored in tables or functions that may be indexed by driver demand wheel torque and gears included in the gear shift. Method 400 proceeds to 414 after determining the desired torque transfer phase duration.

At 414, method 400 determines and commands the on-coming clutch torque capacity. In one example, the on-coming clutch torque capacity may be determined via the following equation:

$$Tq_{on\_clth\_cap} = \left(\frac{RT_{gear\_old}}{RT_{gear\_new}}\right) \cdot Tq_{Tm\_wo\_mod} \cdot \frac{t}{T_{ttp\_dur}}$$

where $Tq_{on\_clth\_cap}$ is the torque capacity of the on-coming clutch, $RT_{gear\_old}$ is the torque ratio (e.g., output torque of the transmission divided by input torque of the transmission when the old gear is engaged) of the transmission operating in the gear being disengaged (e.g., the old gear), $RT_{gear\_new}$ is the torque ratio of the transmission operating in the gear being engaged (e.g., the new gear), $Tq_{Tm\_wo\_mod}$ is the transmission input torque without modification, t is the amount of time elapsed from the start of the torque transfer phase of the present gear shift, $T_{ttp\_dur}$ is the desired duration of the torque transfer phase of the present gear shift. The on-coming clutch is commanded to the value of $Tq_{on\_clth\_cap}$. However, if driveline torque modification is performed by the rear drive unit electric machine instead of the engine and the integrated starter/generator to fill a potential torque hole during the torque transfer phase, then the clutch torque capacity will have a different ending torque capacity. The final clutch torque capacity at the end of the torque transfer phase may be the transmission input torque without modification. Thus, the on-coming clutch torque capacity may be described by the following equation when the rear drive unit electric machine is providing compensation during the torque phase of the power-on upshift:

$$Tq_{on\_clth\_cap} = Tq_{Tm\_wo\_mod} \cdot \frac{t}{T_{ttp\_dur}}$$

These two conditions can be generalized based on the estimated transmission input torque to be:

$$Tq_{on\_clth\_cap} = Tq_{Tm\_est} \cdot \frac{t}{T_{ttp\_dur}}$$

where $Tq_{Tm\_est}$ is estimated transmission input torque as determined at 410. Method 400 proceeds to 416.

At 416, method 400 determines a transmission input minimum instantaneous torque limit. The transmission input minimum instantaneous torque limit may also be referred to as the transmission input instantaneous lower torque threshold. The transmission input torque (e.g., torque provided to the transmission at the transmission clutch housing) should not be less than the transmission input instantaneous lower torque threshold to achieve a smooth transmission assembly output torque. If compensation is provided via the rear drive unit, then the delivered transmission input torque can be commanded independent of this limit. In one example, method 400 determines the transmission input minimum instantaneous torque limit from the following equation:

$$Tq_{Tm\_min\_inst} = Tq_{TnTq\_wo\_mod} + \left(\frac{RT_{gear\_old}}{RT_{gear\_new}} - 1\right) \cdot Tq_{on\_clth\_cap}$$

where $Tq_{Tm\_min\_inst}$ is the transmission input instantaneous minimum torque limit, $RT_{gear\_old}$ is the transmission torque ratio when the old gear is engaged, $RT_{gear\_new}$ is the transmission torque ratio when the new gear is engaged, $Tq_{TnTq\_wo\_mod}$ is transmission input torque without modification, and $Tq_{on\_cltch\_cap}$ is the torque capacity of the on-coming clutch. The second term of the above equation $$\left(e.g., \ \left(\frac{RT_{gear\_old}}{RT_{gear\_new}} - 1\right) \cdot Tq_{on\_clth\_cap}\right)$$

is torque applied to fill potential torque holes during the torque transfer phase of the gear shift.

At 418, method 400 determines a percentage of requested driveline torque increase $$\left(e.g., \ \left(\frac{RT_{gear\_old}}{RT_{gear\_new}} - 1\right) \cdot Tq_{on\_clth\_cap}\right)$$

that is to be provided via the rear drive unit electric machine (e.g., P3 device) and/or the one or more front wheel electric machines (e.g., 135a and 135b). In one example, an energy management portion of a controller adjusts amounts of engine torque, integrated starter/generator torque, front drive electric machine torque, and rear drive unit torque provided during the inertia phase of the gear shift in response to battery SOC, rear drive unit temperature, integrated starter/generator temperature, battery temperature. For example, during conditions where SOC is high, battery temperature is low, and rear drive unit temperature is low, method 400 supplies the entire amount of torque increase $$\left(e.g., \ \left(\frac{RT_{gear\_old}}{RT_{gear\_new}} - 1\right) \cdot Tq_{on\_clth\_cap}\right)$$

via the rear drive unit and the front wheel electric machines to improve driveline efficiency since operating the engine with a torque reserve may decrease engine fuel efficiency. The engine, integrated starter/generator, front wheel electric machines, and rear drive unit electric machine may each individually, or in various combinations, provide the requested driveline torque increase $$\left(\text{e.g.,} \quad \left(\frac{RT_{gear\_old}}{RT_{gear\_new}} - 1\right) \cdot Tq_{on\_clth\_cap}\right).$$

Similarly, percentages of engine torque and integrated starter generator torque that provide $Tq_{TnTq\_wo\_mod}$ may be determined a percentage of the desired wheel torque, and the percentages of wheel torque are adjusted for SOC, rear drive unit temperature, integrated starter/generator temperature, battery temperature, and other conditions. For example, five percent of the desired wheel torque may be provided via the integrated starter/generator, ten percent of the desired wheel torque may be provided via the front wheel electric machines, sixty percent of the desired wheel torque may be provided via the engine, and the rear drive unit may provide twenty five percent of the desired wheel torque. The wheel torque percentages may be adjusted via empirically determined values stored in tables or functions in controller memory.

Method 400 also determines engine torque reserve, rear drive unit electric machine thresholds, and battery power limits via indexing tables or functions in response to engine, rear drive unit electric machine, and integrated starter/generator conditions. The engine may be operating with a torque reserve at the time of the gear shift. The torque reserve is created by retarding spark timing and increasing air flow. Spark timing may be advanced during the torque transfer phase of the gear shift while there is an engine torque reserve to reduce a possibility of a torque hole in the driveline torque response via increasing engine torque. Method 400 proceeds to 420.

At 420, method 400 commands engine, integrated starter/generator, front wheel electric machine, and rear drive unit electric machine torques. The engine, integrated starter/generator, and rear drive unit electric machine are commanded to provide $Tq_{Trn\_min\_inst}$. Method 400 proceeds to exit.

Referring now to FIG. 5, a prophetic example of a power-on upshift with rear drive unit electric machine torque hole filling is shown. The shifting sequence shown in FIG. 5 may be provided via the method of FIG. 4 in cooperation with the system shown in FIGS. 1A-3. The plots shown in FIG. 5 occur at the same time and are aligned in time. Engine torque compensation for torque holes during the torque transfer phase of the power-on upshift is not provided in the sequence of FIG. 5. Vertical lines at times T0-T3 indicate times of particular interest in the sequence. The plots of FIG. 5 are time aligned with each other.

The first plot from the top of FIG. 5 is a plot of engine speed versus time. The vertical axis represents engine speed and engine speed increases in the direction of the vertical axis arrow. The horizontal axis represents time and time increases from the left side of the figure to the right side of the figure. Solid line 502 represents engine speed.

The second plot from the top of FIG. 5 is a plot of various transmission torque control parameters versus time. The vertical axis represents torque and torque increases in the direction of the vertical axis up arrow. Torque above the horizontal axis is positive torque. Torque at the horizontal axis is zero. Torque below the horizontal axis is negative torque and magnitude of negative torque increases in a direction of the vertical axis down arrow. The horizontal axis represents time and time increases from the left side of the figure to the right side of the figure. Dash-dot line 504 represents transmission input maximum instantaneous torque limit or instantaneous transmission input torque not to be exceeded. Solid line 508 represents the total driver torque demand represented in the transmission input torque domain (e.g., torque requested via a human or autonomous vehicle driver). Dashed-dot-dot line 510 represents a sum of transmission input torque (e.g., engine torque and integrated starter/generator torque) and rear drive unit torque reflected to the transmission input housing (e.g., rear drive unit electric machine torque divided by the gear ratio of the engaged transmission gear). Dash-dash-dot line 514 represents transmission input minimum instantaneous torque limit or transmission input instantaneous lower torque threshold, a value of which transmission input torque is not to be less than unless compensation is provided via the rear drive unit. Dash-small dash-small dash line 516 represents rear drive unit motor torque reflected or observed at the transmission input housing (e.g., clutch housing 393 shown in FIG. 3).

The third plot from the top of FIG. 5 is a plot of various additional transmission torque parameters versus time. The vertical axis represents torque and torque increases in the direction of the vertical axis up arrow. The horizontal axis represents time and time increases from the left side of the figure to the right side of the figure. Dotted line 520 represents torque capacity of the transmission's second input clutch (e.g., 127 of FIG. 3). Solid line 522 represents torque capacity of the transmission's first input clutch (e.g., 126 of FIG. 3). Thin solid line 524 represents transmission input torque without torque modification (e.g., driver demand engine torque without modification to compensate for transmission clutch slippage, instantaneous transmission torque limits, transmission hardware torque limits, and other transmission conditions). Dashed line 512 represents actual transmission input torque.

The fourth plot from the top of FIG. 5 is a plot of transmission torque ratio versus time. The vertical axis represents transmission torque ratio and transmission torque ratio increases in the direction of the vertical axis arrow. The horizontal axis represents time and time increases from the left side of the figure to the right side of the figure. Solid line 530 represents actual transmission torque ratio (e.g., ratio of transmission input torque to transmission output torque). Dashed line 532 represents reported transmission torque ratio (e.g., ratio of transmission input torque to transmission output torque as determined from transmission input speed to transmission output speed). Solid line 530 and dashed line 532 are equivalent when only solid line 530 is visible.

The horizontal axis of each plot corresponds to a value of zero for the vertical axis unless otherwise noted. Further, the vertical axis of each plot corresponds to a value of zero time. In addition, torque values above horizontal axes are adding positive torque and torque values below the horizontal axis provide negative torque. Torque values for the various signals may be the same when described as such even though a small gap between traces is shown in the figure. The small gap is shown between traces in some places to improve legibility.

At time T0, the engine speed 502 is increasing and the driver demand engine and integrated starter/generator torque 508 is at a middle level. The sum of transmission input torque (e.g., engine torque and integrated starter/generator torque) and rear drive unit torque reflected to the transmission input clutch housing 510 (e.g., rear drive unit electric machine torque divided by the gear ratio of the engaged transmission gear) is substantially equal to the driver demand engine and integrated starter/generator torque 508 (e.g., within 3% of each other). The driver demand engine and integrated starter/generator torque trace 508 and sum of transmission input torque and rear drive unit electric machine torque reflected to the transmission input housing 510 are shown slightly separated to improve trace visibility. The transmission input maximum instantaneous torque limit 504 is at a higher level and the transmission input minimum instantaneous torque limit 514 is at zero; however it may be a large negative value (e.g., −500 Nm). The rear drive unit electric machine torque reflected to the transmission input 516 is also at zero. The torque capacity of the transmission's first input clutch 522 is at a higher level where the off-going gear is engaged and the transmission input torque with modification 524 is at a middle level. The actual transmission input torque 512 is at a level equal to the transmission input torque without modification 524. The torque capacity of the transmission's second input clutch 520 is zero. The actual transmission torque ratio 530 and the reported transmission torque ratio 532 are at a higher value reflecting that a lower gear is engaged (e.g., $1^{st}$ gear), which provides a higher torque ratio.

At time T1, a power-on upshift begins and the transmission gear shift enters a torque transfer phase. Engine speed 502 continues to increase at its previous rate and driver demand engine and integrated starter/generator torque 508 are at a slightly lower level than at time T0 while the total delivered power is approximately constant. The torque capacity of the transmission's first input clutch 522 (e.g., off-going clutch) starts to be reduced. Shortly thereafter, the transmission input minimum instantaneous torque limit 514 is increased in a step-wise manner. At nearly the same time, the rear drive unit electric machine torque reflected to the transmission input clutch housing 516 begins to increase to fill the torque hole that may occur during the torque transfer phase. The sum of transmission input torque (e.g., engine torque and integrated starter/generator torque) and rear drive unit torque reflected to the transmission input clutch housing 510 is at a slightly lower value than at time T0. The transmission input maximum instantaneous torque limit 504 remains at a higher level and the transmission input torque without modification 524 continues on its present trajectory as does the estimated transmission input torque 512. The torque capacity of the second clutch 520 is zero. The actual transmission torque ratio 530 and the reported transmission torque ratio 532 are at same values.

Between time T1 and time T2, the engine speed 502 continues to increase and the driver demand engine and integrated starter generator torque 508 gradually decreases. The sum of transmission input torque and rear drive unit torque reflected to the transmission input clutch housing 510 begins to increase in response to the increase in rear drive unit electric machine torque 516 and it follows the transmission input minimum instantaneous torque limit 514. The transmission input maximum instantaneous torque limit 504 remains at a higher level. The torque capacity of the transmission's second input clutch 520 (e.g., on-coming clutch) begins to increase while the transmission's first input clutch capacity 522 continues to be decreased. The transmission torque without modification 524 continues to decrease gradually and the estimated transmission input torque 512 continues to follow the transmission torque without modification 524. The transmission's actual torque ratio 530 is reduced and the reported transmission torque ratio 532 remains constant. The transmission input minimum instantaneous torque limit 514 gradually increases as torque capacity of the first transmission clutch 522 decreases, then it decreases to zero shortly before time T2.

At time T2, the torque transfer phase of the power-on upshift ends and the inertia phase of the power-on upshift begins. The transmission minimum instantaneous torque limit 514 remains at zero and engine speed 502 begins to be reduced as torque transfer across the second clutch 520 increases. The driver demand engine and integrated starter/generator torque begins to increase to maintain roughly constant input power. The torque transfer phase ends when the torque capacity of the transmission's first input clutch 522 is zero or substantially zero (e.g., less than 5 Nm). Shortly after the inertia phase begins, the torque capacity of the transmission's second input clutch 520 is increased in a step-wise manner, and then the transmission input maximum instantaneous torque limit 504 is reduced to counteract the inertia torque added to the system during gear shifting. The torque of the rear drive unit 516 is decreased to cease the torque hole filling torque provided during the torque transfer phase of the transmission gear shift. The sum of transmission input torque and rear drive unit electric machine torque reflected to the clutch housing input 510 falls to a level of the transmission input maximum instantaneous torque limit 504 so that the inertia torque added to the system during the inertia phase of the gear shift is compensated. Further, reducing the transmission input maximum instantaneous torque limit 504 reduces estimated transmission input torque 512 and the transmission input speed. The transmission input torque without torque modification 524 begins to increase as the driver demand engine and integrated starter/generator torque 508 increases to provide near equivalent vehicle acceleration after the gear shift completes. The reported torque ratio 532 begins to decrease to indicate that the second gear is being engaged while the actual torque ratio 530 continues at a constant value.

Between time T2 and time T3, the engine speed 502 continues to decrease and driver demand engine and integrated starter/generator torque 508 continues to increase. The transmission input minimum instantaneous torque limit 514 remains at zero and the sum of transmission torque and rear drive unit electric machine torque reflected to the transmission input clutch housing 510 continues to follow the transmission input maximum instantaneous torque limit 504. The rear drive unit electric machine torque reflected at the transmission input clutch housing 516 remains at zero. The capacity of the first clutch 522 remains at zero and the capacity of the second clutch 520 is gradually reduced until just before time T3 where it increases in a step-wise manner. The transmission input torque with modification 524 continues to increase and follow the driver demand torque for the engine and the integrated starter/generator 508. The estimated transmission torque 512 continues at a lower level and follows the transmission input maximum instantaneous torque limit 504. The reported torque ratio 532 continues to decrease to the value of the actual torque ratio 530.

At time T3, the shift completes and the engine speed 502 continues to accelerate. The driver demand engine and integrated starter/generator torque 508 and the sum of transmission input torque and rear drive unit electric machine torque reflected to the transmission input clutch housing 510 are substantially the same values (e.g., within ±3 percent of each other). The rear drive unit electric machine torque reflected to the transmission input clutch housing 516 is zero and the transmission input maximum instantaneous torque limit 504 is a higher value. The transmission input minimum instantaneous torque 514 is a value of zero and the second clutch torque capacity 520 reaches a high value. The first clutch torque capacity 522 is zero and the transmission input torque with modification 524 is equal to the driver demand engine and integrated starter/generator torque 508. The estimated transmission input torque 512 is also equal to the driver demand engine and integrated starter/generator torque 508. The reported torque ratio 532 is equal to the value of the actual torque ratio 530.

In this way, the possibility of a reduction of wheel torque that may occur during a torque transfer phase of a power-on upshift may be reduced via increasing torque output of a rear drive unit electric machine. Further, a torque increase due to inertia torque during the inertia phase of a power-on upshift may be compensated via reducing the torque output of the rear drive unit and reducing transmission input torque (e.g., the combination of engine torque and integrated starter/generator torque).

Referring now to FIG. 6, a prophetic example of a power-on upshift with transmission input actuator hole filling is shown. The shifting sequence shown in FIG. 6 may be provided via the method of FIG. 4 in cooperation with the system shown in FIGS. 1A-3. The plots shown in FIG. 6 occur at the same time and are aligned in time. Rear drive unit electric machine torque compensation for torque holes during the torque transfer phase of a power-on upshift is not provided in the sequence of FIG. 6. Vertical lines at times T10-T13 indicate times of particular interest in the sequence. The plots of FIG. 6 are time aligned with each other.

The first plot from the top of FIG. 6 is a plot of engine speed versus time. The vertical axis represents engine speed and engine speed increases in the direction of the vertical axis arrow. The horizontal axis represents time and time increases from the left side of the figure to the right side of the figure. Solid line 602 represents engine speed.

The second plot from the top of FIG. 6 is a plot of various transmission torque control parameters versus time. The vertical axis represents torque and torque increases in the direction of the vertical axis up arrow. Torque above the horizontal axis is positive torque. Torque at the horizontal axis is zero. Torque below the horizontal axis is negative torque and magnitude of negative torque increases in a direction of the vertical axis down arrow. The horizontal axis represents time and time increases from the left side of the figure to the right side of the figure. Dash-dot line 604 represents transmission input maximum instantaneous torque limit or transmission input instantaneous upper torque threshold not to be exceeded. Solid line 608 represents driver demand engine and integrated starter/generator torque (e.g., torque requested via a human or autonomous vehicle driver). Dash-dot-dot line 610 represents a sum of transmission input torque (e.g., engine torque and integrated starter/generator torque) and rear drive unit torque reflected to the transmission input housing (e.g., rear drive unit electric machine torque divided by the gear ratio of the engaged transmission gear). Dash-dash-dot line 614 represents transmission input minimum instantaneous torque limit or transmission input instantaneous torque lower threshold, which transmission input torque is not to be less than. Dash-small dash-small dash line 616 represents rear drive unit motor torque reflected or observed at the transmission input housing (e.g., clutch housing 393 shown in FIG. 3).

The third plot from the top of FIG. 6 is a plot of various additional transmission torque parameters versus time. The vertical axis represents torque and torque increases in the direction of the vertical axis up arrow. The horizontal axis represents time and time increases from the left side of the figure to the right side of the figure. Dotted line 620 represents torque capacity of the transmission's second input clutch (e.g., 127 of FIG. 3). Solid line 622 represents torque capacity of the transmission's first input clutch (e.g., 126 of FIG. 3). Thin solid line 624 represents transmission input torque without torque modification (e.g., driver demand engine torque modified to compensate for transmission clutch slippage, instantaneous transmission torque limits, transmission hardware torque limits, and other transmission conditions). Dashed line 612 represents actual transmission input torque.

The fourth plot from the top of FIG. 6 is a plot of transmission torque ratio versus time. The vertical axis represents transmission torque ratio and transmission torque ratio increases in the direction of the vertical axis arrow. The horizontal axis represents time and time increases from the left side of the figure to the right side of the figure. Solid line 630 represents actual transmission torque ratio (e.g., ratio of transmission input torque to transmission output torque). Dashed line 632 represents reported transmission torque ratio (e.g., ratio of transmission input torque to transmission output torque as determined from transmission input speed to transmission output speed). Solid line 630 and dashed line 632 are equivalent when only solid line 630 is visible.

The horizontal axis of each plot corresponds to a value of zero for the vertical axis unless otherwise noted. Further, the vertical axis of each plot corresponds to a value of zero time. In addition, torque values above horizontal axes are adding positive torque and torque values below the horizontal axis provide negative torque. Torque values for the various signals may be the same when described as such even though a small gap between traces is shown in the figure. The small gap is shown between traces in some places to improve legibility.

At time T10, the engine speed 602 is increasing and the driver demand engine and integrated starter/generator torque 608 is at a middle level. The sum of transmission input torque (e.g., engine torque and integrated starter/generator torque) and rear drive unit torque reflected to the transmission input clutch housing 610 (e.g., rear drive unit electric machine torque divided by the gear ratio of the engaged transmission gear) is substantially equal to the driver demand engine and integrated starter/generator torque 608 (e.g., within 3% of each other). The transmission input maximum instantaneous torque limit 604 is at a higher level and the transmission input minimum instantaneous torque limit 614 is at zero. The rear drive unit electric machine torque 616 is also at zero. The torque capacity of the transmission's first input clutch 622 is at a higher level and the transmission input torque with modification 624 is at a middle level. The actual transmission input torque 612 is at a level equal to the transmission input torque with modification 624. The torque capacity of the transmission's second input clutch 620 is zero. The actual transmission torque ratio 630 and the reported transmission torque ratio 632 are at a higher value reflecting that a lower gear is engaged (e.g., $1^{st}$ gear), which provides a higher torque ratio. The rear drive unit electric machine torque 616 is at a value of zero.

At time T11, a power-on upshift begins and the transmission gear shift enters a torque transfer phase. Engine speed 602 continues to increase at its previous rate and driver demand engine and integrated starter/generator torque 608 are at a slightly lower level than at time T10. The torque capacity of the transmission's first input clutch 622 (e.g., off-going clutch) starts to be reduced. The transmission input minimum instantaneous torque limit 614 value is slightly lower than its value at time T10. The estimated transmission input torque 612 is also slightly lower than its value at time T10. The sum of transmission input torque (e.g., engine torque and integrated starter/generator torque) and rear drive unit torque reflected to the transmission input clutch housing 610 continues on its trajectory. The transmission input maximum instantaneous torque limit 604 remains at a higher level and the transmission input torque with modification 624 continues on its present trajectory. The torque capacity of the second clutch 620 remains at zero. The actual transmission torque ratio 630 begins to separate from the reported transmission torque ratio 632 as it decreases before the reported transmission ratio begins to decrease. The rear drive unit electric machine torque 616 remains at zero.

Between time T11 and time T12, the engine speed 602 continues to increase and the driver demand engine and integrated starter generator torque 608 gradually decreases. The sum of transmission input torque and rear drive unit torque reflected to the transmission input clutch housing 610 begins to increase in response to the increase in the transmission input instantaneous torque limit 614, which increases to prevent a torque hole. The actual transmission input torque 612 also increases to follow the transmission input minimum instantaneous torque limit 614. The transmission input maximum instantaneous torque limit 604 remains at a higher level. The torque capacity of the transmission's second input clutch 620 (e.g., on-coming clutch) begins to increase while the transmission's first input clutch capacity 622 continues to be decreased. The transmission torque without modification 624 continues to decrease gradually. The rear drive unit electric machine torque 616 remains at zero. The transmission's actual torque ratio 630 is reduced and the reported transmission torque ratio 632 remains constant. The transmission input minimum instantaneous torque limit 614 gradually increases as torque capacity of the first transmission clutch 622 decreases, then it is reduced to zero before time T12.

At time T12, the torque transfer phase of the power-on upshift ends and the inertia phase of the power-on upshift begins. The transmission input minimum instantaneous torque limit 614 is reduced to zero and the driver demand engine and integrated starter/generator torque 608 begins to increase. Engine speed 602 begins to be reduced as torque transfer across the second clutch 620 increases. The torque transfer phase ends when the torque capacity of the transmission's first input clutch 622 is zero or substantially zero (e.g., less than 5 Nm). The torque capacity of the transmission's second input clutch 620 reaches a high value. The transmission input minimum instantaneous torque limit 614 remains at zero. The sum of transmission input torque and rear drive unit electric machine torque reflected to the clutch housing input 610 falls shortly after time T12 to a level of the transmission input maximum instantaneous torque limit 604 so that the inertia torque added to the system during the inertia phase of the gear shift is compensated. Further, reducing the transmission input maximum instantaneous torque limit 604 reduces estimated transmission input torque 612 and the transmission input speed. The transmission input torque without torque modification 624 begins to increase as the driver demand engine and integrated starter/generator torque 608 increases to provide near equivalent vehicle acceleration after the gear shift completes. Engine and/or integrated starter generator torque may be increased to increase the transmission input torque without torque modification. The reported torque ratio 632 begins to decrease to indicate that the second gear is being engaged while the actual torque ratio 630 continues at a constant value.

Between time T12 and time T13, the engine speed 602 continues to decrease and driver demand engine and integrated starter/generator torque 608 continues to increase. The transmission input minimum instantaneous torque limit 614 remains at zero and the sum of transmission input torque and rear drive unit electric machine torque reflected to the transmission input clutch housing 610 continues to follow the transmission input maximum instantaneous torque limit 604. The rear drive unit electric machine torque reflected at the transmission input clutch housing 616 remains at zero. The capacity of the first clutch 622 remains at zero and the capacity of the second clutch 620 is gradually reduced and then increases in a step-wise manner near time T13. The transmission input torque with modification 624 continues to increase and follow the driver demand torque for the engine and the integrated starter/generator 608. The actual transmission torque 612 continues to follow the transmission input maximum input torque limit 604. The reported torque ratio 632 continues to decrease to the value of the actual torque ratio 630.

At time T13, the power-on upshift shift completes and the engine speed 602 continues to accelerate. The driver demand engine and integrated starter/generator torque 608 and the sum of transmission input torque and rear drive unit electric machine torque reflected to the transmission input clutch housing 610 are substantially the same values (e.g., within ±3 percent of each other). The rear drive unit electric machine torque reflected to the transmission input clutch housing 616 is zero and the transmission input maximum instantaneous torque limit 604 is a higher value. The transmission input minimum instantaneous torque 614 is a value of zero and the second clutch torque capacity 620 reaches a high value. The first clutch torque capacity 622 is zero and the transmission input torque with modification 624 is equal to the driver demand engine and integrated starter/generator torque 608. The estimated transmission input torque 612 is also equal to the driver demand engine and integrated starter/generator torque 608. The reported torque ratio 632 is equal to the value of the actual torque ratio 630.

In this way, the possibility of a reduction of wheel torque that may occur during a torque transfer phase of a power-on upshift may be reduced via increasing torque input to a transmission via an engine and/or an integrated starter/generator. Engine torque may be increased via advancing spark timing and/or increasing amounts of air and fuel inducted to the engine. Integrated starter/generator torque may be increased via increasing voltage and/or current supplied to the integrated starter/generator. Further, a torque increase due to inertia torque during the inertia phase of a power-on upshift may be compensated via reducing transmission input torque (e.g., the combination of engine torque and integrated starter/generator torque).

Referring now to FIG. 7, an example method for operating a hybrid driveline to improve transmission gear shifting is shown. The method of FIG. 7 may be incorporated into and may cooperate with the system of FIGS. 1A-3. Further, at least portions of the method of FIG. 7 may be incorporated as executable instructions stored in non-transitory memory while other portions of the method may be performed via a controller transforming operating states of devices and actuators in the physical world.

At 702, method 700 determines a desired transmission gear. In one example, method 700 determines a desired transmission gear in response to vehicle speed and accelerator pedal position or a demanded wheel torque determined from accelerator pedal position. In particular, method 700 indexes a transmission shift schedule stored in controller memory. The transmission shift schedule may be a table or function that holds empirically determined transmission gears. The vehicle speed and accelerator pedal position index memory locations and the table or function outputs the desired transmission gear. Method 700 proceeds to 704 after determining the desired transmission gear.

At 704, method 700 judges if a power-on upshift is requested. A power-on upshift is a gear shift from a lower gear (e.g., $1^{st}$ gear) to a higher gear (e.g., $2^{nd}$ gear) while driver demand torque is greater than zero. The driver demand torque is greater than zero when the accelerator pedal is applied or depressed. A power-on upshift may be requested when the desired gear changes from a lower gear to a higher gear (e.g., shifts from $2^{nd}$ gear to $3^{rd}$ gear) when the accelerator pedal is applied. If method 700 judges that a power-on upshift is requested, the answer is yes and method 700 proceeds to 706. Otherwise, the answer is no and method 700 proceeds to exit.

At 706, method 700 judges if an inertia phase of the gear shift is active. A power-on transmission gear upshift may be comprised of two phases. The first phase is a torque phase or a torque transfer phase and it is a time during the shift where the off-going clutch is opening, but still transferring torque, and the on-coming clutch is closing and beginning to transfer torque. For the dual clutch transmission shown in FIG. 3, the on-coming clutch may be clutch 126 or clutch 127. The off-going clutch may be clutch 126 or clutch 127. For example, the off-going clutch for a particular gear shift may be clutch 126 and the on-coming clutch may be clutch 127. The second phase of the transmission gear shift is an inertia phase and it begins when the off-going clutch stops transferring torque while the on-coming clutch continues to close and transfer torque. The shift ends when the on-coming clutch is fully closed and there is substantially zero slip (e.g., less than 30 RPM speed difference from the input side of the clutch to the output side of the clutch). In one example, method 700 determines if the inertia phase is active in response to a time since the off-going clutch release began and a time since on-coming clutch application began. For example, method 700 may include empirically determined timing values for torque phase and inertia phases for each transmission gear shift (e.g., $1^{st}$ to $2^{nd}$ gear, $2^{nd}$ to $3^{rd}$ gear, etc.) Additionally, the torque and inertia phase times of a transmission gear shift may be adapted. If the time from the beginning of the transmission gear shift indicates that the transmission gear shift is in an inertia phase, the answer is yes and method 700 proceeds to 708. Otherwise, the answer is no and method 400 proceeds to 750.

At 750, method 700 adjusts off-going clutch torque capacity (e.g., the amount of torque the clutch may transfer from an input side of the clutch, such as the engine side of the clutch, to an output side of the clutch, such as the gearbox side of the clutch) and the on-coming clutch torque capacity during the torque transfer phase of the power-on upshift. Method 700 also adjusts transmission input torque during the torque transfer phase of the gear shift. In one example, the torque capacity of the on-coming clutch may be adjusted according to the following equation:

$$Tq_{oncl\_cap} = \left(\frac{RT_{gear\_old}}{RT_{gear\_new}}\right) \cdot Tq_{Trn\_wo\_mod} \cdot \frac{t}{T_{ttp\_dur}}$$

where $Tq_{oncl\_cap}$ is the torque capacity of the on-coming clutch, $RT_{gear\_old}$ is the torque ratio (e.g., output torque of the transmission divided by input torque of the transmission when the old gear is engaged) of the transmission with gear that is being disengaged (e.g., the old gear), $RT_{gear\_new}$ is the torque ratio of the transmission with the gear that is being engaged (e.g., the new gear), $Tq_{Trn\_wo\_mod}$ is the transmission input torque without modification, t is the amount of time elapsed from the start of the torque transfer phase of the present gear shift, $T_{ttp\_dur}$ is the desired duration of the torque transfer phase of the present gear shift. The desired of the torque transfer duration phase of the transmission gear shift may be empirically determined and stored to memory in a controller. And, the transmission input torque without modification may be determined as described at 708.

Transmission input torque (e.g., torque provided via an engine and/or an integrated starter/generator) may be adjusted according to the following equation:

$$Tq_{Trn\_inst\_min} = Tq_{Trn\_wo\_mod} + \left(\frac{RT_{gear\_old}}{RT_{gear\_new}} - 1\right) Tq_{oncl\_cap}$$

where $Tq_{Trn\_inst\_min}$ is the transmission input instantaneous minimum torque limit or transmission input instantaneous lower torque threshold that is not to be exceeded. Method 400 proceeds to exit after beginning the torque transfer portion of the transmission gear shift.

At 708, method 700 determines transmission input torque in the old gear (e.g., the gear being disengaged). Torque demand in the old gear is a hypothetical transmission input torque demand determined from hypothetical engine speed and transmission torque ratio. Hypothetical or pseudo-engine speed is the transmission torque ratio when the transmission is engaged in the old gear multiplied by the transmission output speed. The transmission torque ratio is the torque ratio of the transmission when the transmission is engaged in the old gear. The torque demand may be determined from output of a table or function of empirically determined values that is indexed via the transmission torque ratio when the transmission is engaged in the old gear and the hypothetical engine speed determined by multiplying the transmission output shaft speed by the torque ratio of the transmission when the transmission is operating in the old gear. Method 400 proceeds to 410 after determining the driver demand torque in the old gear.

At 710, method 700 determines a transmission input torque for operating the transmission in the new transmission gear or the transmission gear to be engaged at the end of the transmission gear shift. Torque demand in the new gear is a hypothetical transmission input torque demand determined from hypothetical engine speed and transmission torque ratio. Hypothetical engine speed is the transmission torque ratio when the new gear is engaged multiplied by the transmission output speed. The transmission torque ratio is the torque ratio of the transmission when the transmission is engaged in the old gear. The torque demand may be determined from output of a table or function of empirically determined values that is indexed via the transmission torque ratio when the transmission is engaged in the new gear and the hypothetical engine speed determined by multiplying the transmission output shaft speed by the torque ratio of the transmission when the transmission is operating in the new gear. Method 400 proceeds to 410 after determining the driver demand torque in the old gear. Method 700 proceeds to 712.

At 712, method 700 determines a desired torque transfer phase duration. The desired torque transfer phase duration values may be empirically determined and stored in tables or functions that may be indexed by driver demand wheel torque and gears included in the gear shift. Method 700 proceeds to 714 after determining the desired gear ratio change duration.

At 714, method 700 determines the on-coming clutch torque capacity. In particular, the on-coming clutch torque capacity may be determined via the following equation:

$$Tq_{on\_clth\_cap} = \left(\frac{RT_{gear\_old}}{RT_{gear\_new}} \cdot Tq_{Tm\_in\_newgear} \cdot \left(1 - \frac{t}{T_{shft\_dur}}\right)\right) + \left(\frac{t}{T_{shft\_dur}} \cdot Tq_{Tm\_in\_oldgear}\right)$$

where $Tq_{on\_clth\_cap}$ is the on-coming clutch torque capacity, $RT_{gear\_new}$ is the torque ratio of the transmission operating in the new gear, $RT_{gear\_old}$ is the torque ratio of the transmission operating in the old gear, $Tq_{Tm\_in\_newgear}$ is the transmission input torque in the new gear immediately after the on-coming clutch fully closes (e.g., less than ±5 clutch slip), t is time elapsed in the inertia phase of the power-on upshift, $T_{shft\_dur}$ is the duration of the shift or gear ratio change, and $Tq_{Tm\_in\_oldgear}$ is the transmission input torque in the old gear immediately before the off-going clutch begins to be released. The value of $Tq_{Tm\_in\_newgear}$ is determined before the new gear is fully engaged.

This method compensates for both the change in transmission input torque (e.g., driver demanded transmission input torque) and the difference between the actual torque ratio of the transmission and the reported transmission torque ratio. The difference between the on-coming clutch torque capacity and the maximum transmission input torque limit specifies how fast the ratio change occurs. The transmission input torque value is maintained as a constant to improve shift quality even though the maximum transmission input torque limit may change during the transmission gear ratio change. Method 700 proceeds to 716.

At 716, method 700 determines the transmission input maximum instantaneous torque limit, which may be referred to as a transmission input instantaneous upper torque threshold that is not to be exceeded. In one example, the transmission input maximum instantaneous torque limit may be determined via the following equation:

$$Tq_{Tm\_inst\_max} = \frac{1}{2} \cdot \left(Tq_{Tm\_in\_newgear} + \frac{RT_{gear\_old}}{RT_{gear\_new}} \cdot Tq_{Tm\_in\_oldgear}\right) - J_{Tm\_in} \cdot \omega_{Tm\_out} \cdot \left(\frac{RT_{gear\_old} - RT_{gear\_new}}{T_{shft\_dur}}\right)$$

where $Tq_{Tm\_inst\_max}$ is the transmission input maximum instantaneous torque limit, $Tq_{Tm\_in\_newgear}$ is the transmission input torque in the new gear immediately after the on-coming clutch fully closes, $RT_{gear\_new}$ is the torque ratio of the transmission operating in the new gear, $RT_{gear\_old}$ is the torque ratio of the transmission operating in the old gear, $Tq_{Tm\_in\_oldgear}$ is the transmission input torque in the old gear immediately before the off-going clutch begins to be released, $J_{Tm\_in}$ is the transmission effective input inertia, $\omega_{Tm\_out}$ is the transmission output shaft angular speed, and $T_{shft\_dur}$ is the duration of the shift or gear ratio change. Method 700 proceeds to 718.

At 718, method 700 adjusts transmission input torque actuators to provide the desired transmission input torque reduction. Transmission input torque actuators include actuators that adjust engine torque and/or torque of an integrated starter/generator, if present. Engine torque actuators may include, but are not limited to fuel injectors, throttles, camshafts, and ignition systems. Integrated starter/generator torque actuators may include inverters and/or other voltage/current sources supplying electric power to the integrated starter/generator. The transmission torque actuators are adjusted to provide torque during the inertia phase of a power-on upshift that is less than or equal to $Tq_{Tm\_inst\_max}$, which is the transmission input maximum instantaneous torque limit. In addition, the on-coming clutch torque capacity is adjusted according to the clutch capacity determined at 714. The engine and integrated starter/generator torques are adjusted to satisfy the transmission instantaneous maximum torque limit or the transmission instantaneous upper torque thresholds shown in FIGS. 8-10. Method 700 proceeds to exit.

Referring now to FIG. 8, a prophetic example of a power-on upshift is shown with compensation for engine charging of a battery via a rear drive unit electric machine when the rear drive unit is providing a constant torque to limit driveline noise vibration and harshness (NVH) is shown. The shifting sequence shown in FIG. 8 may be provided via the method of FIG. 7 in cooperation with the system shown in FIGS. 1A-3. The plots shown in FIG. 8 occur at the same time and are aligned in time. Vertical lines at times T20-T23 indicate times of particular interest in the sequence. The plots of FIG. 8 are time aligned with each other.

The first plot from the top of FIG. 8 is a plot of engine speed versus time. The vertical axis represents engine speed and engine speed increases in the direction of the vertical axis arrow. The horizontal axis represents time and time increases from the left side of the figure to the right side of the figure. Solid line 802 represents engine speed.

The second plot from the top of FIG. 8 is a plot of various transmission torque control parameters versus time. The vertical axis represents torque and torque increases in the direction of the vertical axis up arrow. Torque above the horizontal axis is positive torque. Torque at the horizontal axis is zero. Torque below the horizontal axis is negative torque and magnitude of negative torque increases in a direction of the vertical axis down arrow. The horizontal axis represents time and time increases from the left side of the figure to the right side of the figure. Dash-dot line 804 represents transmission input maximum instantaneous torque limit or transmission input instantaneous upper torque threshold not to be exceeded. Solid line 808 represents the total driver torque demand represented in the input torque domain (e.g., torque requested via a human or autonomous vehicle driver). Dash-dot-dot line 810 represents a sum of transmission input torque (e.g., engine torque and integrated starter/generator torque) and rear drive unit torque reflected to the transmission input housing (e.g., rear drive unit electric machine torque divided by the gear ratio of the engaged transmission gear). Dash-dash-dot line 814 represents transmission input minimum instantaneous torque limit or transmission input instantaneous lower torque threshold, which transmission input torque is not to be less than. Dash-small dash-small dash line 817 represents actual rear drive unit motor torque reflected or observed at the transmission input clutch housing (e.g., clutch housing 393 shown in FIG. 3). Dash-dot line 816 represents a hypothetical rear drive unit motor reflected to the transmission input clutch housing (e.g., clutch housing 393 shown in FIG. 3) using the estimated torque ratio (which is approximated by the speed ratio of the transmission). Dash-dash-dot line 825 represents transmission input torque in the new gear immediately after the gear shift.

The third plot from the top of FIG. 8 is a plot of various additional transmission torque parameters versus time. The vertical axis represents torque and torque increases in the direction of the vertical axis up arrow. The horizontal axis represents time and time increases from the left side of the figure to the right side of the figure. Dotted line 820 represents torque capacity of the transmission's second input clutch (e.g., 127 of FIG. 3). Solid line 822 represents torque capacity of the transmission's first input clutch (e.g., 126 of FIG. 3). Thin solid line 824 represents transmission input torque without torque modification (e.g., driver demand engine torque modified to compensate for transmission clutch slippage, instantaneous transmission torque limits, transmission hardware torque limits, and other transmission conditions). Dashed line 812 represents the actual transmission input torque. Dash-dash-dot line 825 represents transmission input torque in the new gear immediately after the gear shift.

The fourth plot from the top of FIG. 8 is a plot of transmission torque ratio versus time. The vertical axis represents transmission torque ratio and transmission torque ratio increases in the direction of the vertical axis arrow. The horizontal axis represents time and time increases from the left side of the figure to the right side of the figure. Solid line 830 represents actual transmission torque ratio (e.g., ratio of transmission input torque to transmission output torque). Dashed line 832 represents reported transmission torque ratio (e.g., ratio of transmission input torque to transmission output torque as determined from transmission input speed to transmission output speed). Solid line 830 and dashed line 832 are equivalent when only solid line 830 is visible.

The horizontal axis of each plot corresponds to a value of zero for the vertical axis unless otherwise noted. Further, the vertical axis of each plot corresponds to a value of zero time. In addition, torque values above horizontal axes are adding positive torque and torque values below the horizontal axis provide negative torque. Torque values for the various signals may be the same when described as such even though a small gap between traces is shown in the figure. The small gap is shown between traces in some places to improve legibility.

At time T20, the engine speed 802 is increasing and the driver demand engine and integrated starter/generator torque 808 is at a middle level. The actual transmission input torque 812 is at a higher level that is equal to the driver demand torque 808 plus torque to counteract the hypothetical rear drive unit electric machine torque 816. The sum of transmission input torque (e.g., engine torque and integrated starter/generator torque) and rear drive unit torque reflected to the transmission input clutch housing 810 (e.g., rear drive unit electric machine torque divided by the gear ratio of the engaged transmission gear) is substantially equal to the total driver demand 808 (e.g., within 3% of each other). The transmission input maximum instantaneous torque limit 804 is at a higher level and the transmission input minimum instantaneous torque limit 814 is at zero. The transmission input torque in the new gear immediately after the gear shift 825 is not determined at time T20 since the transmission gear shift has not started. The rear drive unit electric machine torque 817 is a negative value indicating that the battery is being charged via the rear drive unit electric machine. The torque capacity of the transmission's first input clutch 822 is at a higher level and the transmission input torque with modification 824 is at a middle level. The actual transmission input torque 812 is at a level equal to the transmission input torque without modification 824. The torque capacity of the transmission's second input clutch 820 is zero. The actual transmission torque ratio 830 and the reported transmission torque ratio 832 are at a higher value reflecting that a lower gear is engaged (e.g., $1^{st}$ gear), which provides a higher torque ratio.

At time T21, a power-on upshift begins and the transmission gear shift enters a torque transfer phase. Engine speed 802 continues to increase at its previous rate and driver demand engine and integrated starter/generator torque 808 are at a slightly lower level than at time T20. The torque capacity of the transmission's first input clutch 822 (e.g., off-going clutch) starts to be reduced. The transmission input minimum instantaneous input torque limit 814 is zero. The sum of transmission input torque (e.g., engine torque and integrated starter/generator torque) and rear drive unit torque reflected to the transmission input clutch housing 810 is at a slightly lower level than it is at time T0. The transmission input maximum instantaneous torque limit 804 remains at a higher level and the transmission input torque with modification 824 continues on its present trajectory. The torque capacity of the second clutch 820 is zero. The actual transmission torque ratio 830 continues on its present trajectory. The rear drive unit electric machine torque 816 remains at a constant negative value. The transmission input torque in the new gear immediately after the gear shift 825 is at a level greater than the driver demand engine and integrated starter/generator torque 808 to reflect the transmission input torque that will provide the same level of vehicle acceleration after the gear shift as before the gear shift.

Between time T21 and time T22, the engine speed 802 continues to increase and the driver demand engine and integrated starter generator torque 808 gradually decreases. The sum of transmission input torque and rear drive unit torque reflected to the transmission input clutch housing 810 and the actual transmission input torque 812 increases in response to the transmission input minimum instantaneous torque limit 814 increasing. The transmission input minimum torque limit 814 increases to fill in a torque hole that may develop as the first clutch is being released. The transmission input maximum instantaneous torque limit 804 remains at a higher level. The torque capacity of the transmission's second input clutch 820 (e.g., on-coming clutch) continues to increase while the transmission's first input clutch capacity 822 continues to be decreased. The transmission input torque without modification 824 continues to decrease gradually. The rear drive unit electric machine torque remains constant during this phase. However, because the actual transmission torque ratio decreases, the rear drive unit electric machine torque reflected to the input domain 817 decreases (becomes more negative). The hypothetical rear drive unit electric machine torque reflected to the input domain using the estimated torque ratio 816 remains constant because the estimated torque ratio remains constant.

In this example, the system is attempting to provide a constant engine charging torque which could be the result of a noise vibration and harshness (NVH) limit. Because this portion of the transmission assembly input torque does not change with engine speed like the driver demand portion, the difference between the estimated torque ratio and the actual torque ratio results in the transmission minimum torque limit needing to increase to a value greater than the steady-state torque in the final gear 825.

The transmission's actual torque ratio 830 begins to be reduced and the reported transmission torque ratio 832 remains constant. The transmission input minimum instantaneous torque limit 814 gradually increases as torque capacity of the first transmission clutch 822 decreases. The transmission input torque in the new gear decreases gradually. The transmission input torque in the new gear immediately after the gear shift 825 is gradually reduced.

At time T22, the torque transfer phase of the power-on upshift ends and the inertia phase of the power-on upshift begins. The transmission input minimum instantaneous torque limit 814 is reduced to zero to cease torque hole filling during the torque transfer phase and the actual transmission input torque 812 is decreased in response to reducing the transmission input minimum instantaneous input torque limit 814 and reducing the transmission input maximum instantaneous input torque limit 804. Engine speed 802 begins to be reduced during the inertia phase of the transmission gear shift and torque capacity of the second clutch 820 begins to be reduced. The torque transfer phase ends when the torque capacity of the transmission's first input clutch 822 is zero or substantially zero (e.g., less than 5 Nm). Shortly after the inertia phase begins, the torque capacity of the transmission's second input clutch 820 begins to be reduced gradually. The sum of transmission input torque and rear drive unit electric machine torque reflected to the clutch housing input 810 is reduced to a level below the transmission input maximum instantaneous torque limit 804. The transmission input torque without torque modification 824 is increased in response to the engine speed decreasing (providing roughly constant input power). The reported torque ratio 832 begins to decrease to indicate that the second gear is being engaged while the actual torque ratio 830 continues at a constant value. The rear drive unit electric machine torque 816 remains at a constant negative value. The transmission input torque in the new gear immediately after the gear shift 825 is at a lower level than at time T21.

Between time T22 and time T23, the engine speed 802 continues to decrease and total driver demand torque 808 continues to increase. The transmission input minimum instantaneous torque limit 814 remains at zero and the sum of transmission input torque and rear drive unit electric machine torque reflected to the transmission input clutch housing 810 continues to be less than the transmission input maximum instantaneous torque limit 804. The transmission input maximum instantaneous torque limit 804 is constant for a period of time and then it increases near time T23 in response to the transmission input maximum instantaneous torque limit 804 increasing. The rear drive unit electric machine torque reflected at the transmission input clutch housing 816 remains at a negative value. The capacity of the first clutch 822 remains at zero and the capacity of the second clutch 820 is gradually reduced. The transmission input torque without modification 824 continues to increase and follow the driver demand torque for the engine and the integrated starter/generator 808. The actual transmission input torque 812 continues to follow the transmission input maximum torque limit 804. The reported torque ratio 832 continues to decrease to the value of the actual torque ratio 830. The transmission input torque in the new gear immediately after the gear shift 825 continues to be reduced.

At time T23, the shift completes and the engine speed 802 begins to accelerate. The driver demand engine and integrated starter/generator torque 808 and the sum of transmission input torque and rear drive unit electric machine torque reflected to the transmission input clutch housing 810 are substantially the same values (e.g., within ±3 percent of each other). The rear drive unit electric machine torque reflected to the transmission input clutch housing 816 is at the same negative value and the transmission input maximum instantaneous torque limit 804 is a higher value. The transmission input minimum instantaneous torque 814 is a value of zero and the second clutch torque capacity 820 reaches a high value. The first clutch torque capacity 822 is zero and the transmission input torque with modification 824 is equal to the driver demand engine and integrated starter/generator torque 808. The driver demand engine and integrated starter/generator torque 808 begins to be gradually reduced. The estimated transmission input torque 812 is equal to the driver demand engine and integrated starter/generator torque 808 plus torque to compensate for the negative hypothetical rear drive unit electric machine torque 816. The estimated transmission torque is also equal to the transmission input torque in the new gear immediately after the gear shift 825. The reported torque ratio 832 is equal to the value of the actual torque ratio 830.

In this way, an engine may deliver power to charge a battery via the rear drive unit electric machine while a smooth gear shift is performed. In particular, on-coming clutch torque capacity may be adjusted in response to a transmission input torque expected to be applied after the shift is complete and a new gear is engaged.

Referring now to FIG. 9, a prophetic example of a power-on upshift is shown with compensation for engine charging of a battery via a rear drive unit electric machine when the rear drive unit is providing a constant amount of power to a battery is shown. The shifting sequence shown in FIG. 9 may be provided via the method of FIG. 7 in cooperation with the system shown in FIGS. 1A-3. The plots shown in FIG. 9 occur at the same time and are aligned in time. Vertical lines at times T30-T33 indicate times of particular interest in the sequence. The plots of FIG. 9 are time aligned with each other.

The first plot from the top of FIG. 9 is a plot of engine speed versus time. The vertical axis represents engine speed and engine speed increases in the direction of the vertical axis arrow. The horizontal axis represents time and time increases from the left side of the figure to the right side of the figure. Solid line 902 represents engine speed.

The second plot from the top of FIG. 9 is a plot of various transmission torque control parameters versus time. The vertical axis represents torque and torque increases in the direction of the vertical axis up arrow. Torque above the horizontal axis is positive torque. Torque at the horizontal axis is zero. Torque below the horizontal axis is negative torque and magnitude of negative torque increases in a direction of the vertical axis down arrow. The horizontal axis represents time and time increases from the left side of the figure to the right side of the figure. Dash-dot line 904 represents transmission input maximum instantaneous torque limit or transmission input instantaneous upper torque threshold not to be exceeded. Solid line 908 represents the total driver torque demand represented in the transmission input torque domain (e.g., torque requested via a human or autonomous vehicle driver). Dash-dot-dot line 910 represents a sum of transmission input torque (e.g., engine torque and integrated starter/generator torque) and rear drive unit torque reflected to the transmission input clutch housing (e.g., rear drive unit electric machine torque divided by the gear ratio of the engaged transmission gear). Dash-dash-dot line 914 represents transmission input minimum instantaneous torque limit or transmission input lower torque threshold, which transmission input torque is not to be less than. Dash-small dash-small dash line 916 represents a hypothetical rear drive unit motor torque reflected at the transmission input clutch housing (e.g., clutch housing 393 shown in FIG. 3) using the estimated torque ratio (which is approximated by the speed ratio of the transmission). Dash-dot line 917 represents actual rear drive unit motor torque reflected or observed at the transmission input clutch housing (e.g., clutch housing 393 shown in FIG. 3). Dash-dot line 917 represents a hypothetical rear drive unit motor torque reflected to the transmission input clutch housing that is estimated using the estimated torque ratio as determined from input and output speeds of the transmission. Dash-dash-dot line 925 represents transmission input torque in the new gear immediately after the gear shift.

The third plot from the top of FIG. 9 is a plot of various additional transmission torque parameters versus time. The vertical axis represents torque and torque increases in the direction of the vertical axis up arrow. The horizontal axis represents time and time increases from the left side of the figure to the right side of the figure. Dotted line 920 represents torque capacity of the transmission's second input clutch (e.g., 127 of FIG. 3). Solid line 922 represents torque capacity of the transmission's first input clutch (e.g., 126 of FIG. 3). Thin solid line 924 represents transmission input torque without torque modification (e.g., driver demand engine torque modified to compensate for transmission clutch slippage, instantaneous transmission torque limits, transmission hardware torque limits, and other transmission conditions). Dashed line 912 represents actual transmission input torque. Dash-dash-dot line 925 represents transmission input torque in the new gear immediately after the gear shift.

The fourth plot from the top of FIG. 9 is a plot of transmission torque ratio versus time. The vertical axis represents transmission torque ratio and transmission torque ratio increases in the direction of the vertical axis arrow. The horizontal axis represents time and time increases from the left side of the figure to the right side of the figure. Solid line 930 represents actual transmission torque ratio (e.g., ratio of transmission input torque to transmission output torque). Dashed line 932 represents reported transmission torque ratio (e.g., ratio of transmission input torque to transmission output torque as determined from transmission input speed to transmission output speed). Solid line 930 and dashed line 932 are equivalent when only solid line 930 is visible.

The horizontal axis of each plot corresponds to a value of zero for the vertical axis unless otherwise noted. Further, the vertical axis of each plot corresponds to a value of zero time. In addition, torque values above horizontal axes are adding positive torque and torque values below the horizontal axis provide negative torque. Torque values for the various signals may be the same when described as such even though a small gap between traces is shown in the figure. The small gap is shown between traces in some places to improve legibility.

At time T30, the engine speed 902 is increasing and the driver demand engine and integrated starter/generator torque 908 is at a middle level. Actual transmission input torque 912 is at a higher level that is equal to the driver demand torque 908 plus torque to balance or counteract the hypothetical rear drive unit electric machine torque 916. The sum of transmission input torque (e.g., engine torque and integrated starter/generator torque) and hypothetical rear drive unit torque reflected to the transmission input clutch housing 910 (e.g., rear drive unit electric machine torque divided by the estimated transmission torque ratio is substantially equal to the total driver demand torque 908 (e.g., within 3% of each other). The transmission input maximum instantaneous torque limit 904 is at a higher level and the transmission input minimum instantaneous torque limit 914 is at zero. The transmission input torque in the new gear immediately after the gear shift 925 is not determined at time T30 since the transmission gear shift has not started. The rear drive unit electric machine torque 917 is a negative value indicating that the battery is being charged via the rear drive unit electric machine. The torque capacity of the transmission's first input clutch 922 is at a higher level and the transmission input torque with modification 924 is at a middle level. The actual transmission input torque 912 is at a level equal to the transmission input torque without modification 924. The torque capacity of the transmission's second input clutch 920 is zero. The actual transmission torque ratio 930 and the reported transmission torque ratio 932 are at a higher value reflecting that a lower gear is engaged (e.g., $1^{st}$ gear), which provides a higher torque ratio.

At time T31, a power-on upshift begins and the transmission gear shift enters a torque transfer phase. Engine speed 902 continues to increase at its previous rate and driver demand engine and integrated starter/generator torque 908 are at a slightly lower level than at time T30. The torque capacity of the transmission's first input clutch 922 (e.g., off-going clutch) starts to be reduced. The transmission input minimum instantaneous torque limit 914 is zero. The actual transmission input torque 912 continues one it previous trajectory. The sum of transmission input torque (e.g., engine torque and integrated starter/generator torque) and rear drive unit torque reflected to the transmission input clutch housing 910 continues along its present trajectory. The transmission input maximum instantaneous torque limit 904 remains at a higher level and the transmission input torque without modification 924 continues on its present trajectory. The torque capacity of the second clutch 920 remains at zero. The actual transmission torque ratio 930 and the reported transmission torque ratio 932 are at a same level. The rear drive unit electric machine torque remains constant. Because the estimated transmission torque ratio also remains constant, the hypothetical rear drive unit electric machine torque reflected to the transmission input 916 remains at a constant negative value. However, the magnitude of the actual rear drive unit electric machine torque reflected to the transmission input 917 increases because the actual transmission torque ratio decreases. The transmission input torque in the new gear immediately after the gear shift 925 is at a level greater than the driver demand engine and integrated starter/generator torque 908 to reflect the transmission input torque that will provide the same level of vehicle acceleration after the gear shift as before the gear shift.

Between time T31 and time T32, the engine speed 902 continues to increase and the driver demand engine and integrated starter generator torque 908 decreases gradually. The sum of transmission input torque and rear drive unit torque reflected to the transmission input clutch housing 910 and the actual transmission input torque 912 increases in response to the transmission input minimum instantaneous torque limit 914 increasing. The transmission input minimum instantaneous torque limit 914 increases to fill a potential torque hole that may develop due to releasing the off-going clutch. The sum of transmission input torque and rear drive unit torque reflected to the transmission input clutch housing 910 also increases to fill a torque hole that may develop during the torque transfer phase of the gear shift. The transmission input maximum instantaneous torque limit 904 remains at a higher level. The torque capacity of the transmission's second input clutch 920 (e.g., on-coming clutch) decreases for a short period of time and then increases to begin torque transfer to the on-coming gear (e.g., new gear). The transmission's first input clutch capacity 922 continues to decrease. The transmission torque with modification 924 decreases for a short period of time and then increases in response to the transmission input minimum instantaneous torque limit increasing. The rear drive unit electric machine torque 916 remains at a constant negative value. The transmission's actual torque ratio 930 continues to be reduced and the reported transmission torque ratio 932 remains constant. The transmission input minimum instantaneous torque limit 914 gradually increases as torque capacity of the first transmission clutch 922 decreases and then it is reduced to zero near time T32. The transmission input torque in the new gear immediately after the gear shift 925 is gradually reduced.

At time T32, the torque transfer phase of the power-on upshift ends and the inertia phase of the power-on upshift begins. The torque transfer phase ends when the torque capacity of the transmission's first input clutch 922 is zero or substantially zero (e.g., less than 5 Nm). The transmission input minimum instantaneous torque limit 914 is reduced to zero to end torque hole filling compensation during the torque transfer phase. The actual transmission input torque 912 continues to increase and driver demand engine and integrated starter generator torque 908 begins to increase. The transmission input maximum instantaneous torque limit 904 is at a higher level, but is reduced shortly after time T32. The sum of transmission input torque and rear drive unit electric machine torque reflected to the clutch housing input 910 is also continues to increase. Engine speed 902 is at a higher level, but begins to be reduced shortly after time T32 during the inertia phase of the transmission gear shift. The transmission input torque without torque modification 924 is decreased in response to entering the inertia phase of the power-on upshift. The reported torque ratio 932 begins to decrease to indicate that the second gear is being engaged while the actual torque ratio 930 continues at a constant value. The actual rear drive unit electric machine torque remains constant. The actual rear drive unit electric machine torque reflected to the transmission input 917 also remains constant. The magnitude of the hypothetical rear drive unit electric machine torque 916 begins to increase because the estimated transmission torque ratio decreases. The transmission input torque in the new gear immediately after the gear shift 925 is at a lower level than at time T31.

Between time T32 and time T33, the engine speed 902 continues to decrease and driver demand engine and integrated starter/generator torque 908 is increased in response to entering the inertia phase of the transmission gear shift because the system is attempting to provide a constant battery charging power. The system makes the shift similar to a shift without battery charging with a higher driver demand torque. This is because the battery power contribution and the driver demand contribution are both roughly constant power. The transmission input minimum instantaneous torque limit 914 remains at zero and the sum of transmission input torque and rear drive unit electric machine torque reflected to the transmission input clutch housing 910 is decreased near time T32 and then increases near time T33. The transmission input maximum instantaneous torque limit 904 is reduced shortly after time T32 and then it increases near time T33 to reduce inertia torque. The magnitude of the rear drive unit electric machine torque reflected at the transmission input clutch housing 916 increases and then it becomes constant near time T33. The capacity of the first clutch 922 remains at zero and the capacity of the second clutch 920 is gradually reduced. The transmission input torque with modification 924 decreases at time T32 and then it increases before time T33. The actual transmission torque 912 follows the transmission input maximum input torque limit 904. The reported torque ratio 932 decreases to the value of the actual torque ratio 930. The transmission input torque in the new gear immediately after the gear shift 925 continues to be reduced.

At time T93, the shift completes and the engine speed 902 begins to accelerate. The driver demand engine and integrated starter/generator torque 908 and the sum of transmission input torque and rear drive unit electric machine torque reflected to the transmission input clutch housing 910 are substantially the same values (e.g., within ±3 percent of each other). The magnitude of rear drive unit electric machine torque reflected to the transmission input clutch housing 916 is at the same negative value and the transmission input maximum instantaneous torque limit 904 is at a higher value. The transmission input minimum instantaneous torque 914 is a value of zero and the second clutch torque capacity 920 increases to a higher value. The first clutch torque capacity 922 is zero and the transmission input torque with modification 924 is equal to the transmission input torque in the new gear immediately after the gear shift 925. The driver demand engine and integrated starter/generator torque 908 also begins to be gradually reduced. The actual transmission input torque 912 is equal to the driver demand engine and integrated starter/generator torque 908 plus torque to compensate for the negative rear drive unit electric machine torque 916. The actual transmission torque 912 is also equal to the transmission input torque in the new gear immediately after the gear shift 925. The reported torque ratio 932 is equal to the value of the actual torque ratio 930.

In this way, an engine may deliver constant power to charge a battery via the rear drive unit electric machine while a smooth gear shift is performed. In particular, on-coming clutch torque capacity may be adjusted in response to a transmission input torque expected to be applied after the shift is complete and a new gear is engaged.

Referring now to FIG. 10, a prophetic example of a power-on upshift is shown with compensation for engine charging of a battery via a rear drive unit electric machine when the engine is operated at a same load before and after the upshift is shown. The shifting sequence shown in FIG. 10 may be provided via the method of FIG. 7 in cooperation with the system shown in FIGS. 1A-3. The plots shown in FIG. 10 occur at the same time and are aligned in time. Vertical lines at times T40-T43 indicate times of particular interest in the sequence. The plots of FIG. 10 are time aligned with each other.

The first plot from the top of FIG. 10 is a plot of engine speed versus time. The vertical axis represents engine speed and engine speed increases in the direction of the vertical axis arrow. The horizontal axis represents time and time increases from the left side of the figure to the right side of the figure. Solid line 1002 represents engine speed.

The second plot from the top of FIG. 10 is a plot of various transmission torque control parameters versus time. The vertical axis represents torque and torque increases in the direction of the vertical axis up arrow. Torque above the horizontal axis is positive torque. Torque at the horizontal axis is zero. Torque below the horizontal axis is negative torque and magnitude of negative torque increases in a direction of the vertical axis down arrow. The horizontal axis represents time and time increases from the left side of the figure to the right side of the figure. Dash-dot line 1004 represents transmission input maximum instantaneous torque limit or transmission input upper torque threshold not to be exceeded. Solid line 1008 represents driver demand engine and integrated starter/generator torque (e.g., torque requested via a human or autonomous vehicle driver). Dash-dot-dot line 1010 represents a sum of transmission input torque (e.g., engine torque and integrated starter/generator torque) and rear drive unit torque reflected to the transmission input housing (e.g., rear drive unit electric machine torque divided by the gear ratio of the engaged transmission gear). Dash-dash-dot line 1014 represents transmission input minimum instantaneous torque limit or transmission input instantaneous lower torque threshold, which transmission input torque is not to be less than. Dash-small dash-small dash line 1016 represents rear drive unit motor torque reflected or observed at the transmission input clutch housing (e.g., clutch housing 393 shown in FIG. 3). Dash-dash-dot line 1025 represents transmission input torque in the new gear immediately after the gear shift.

The third plot from the top of FIG. 10 is a plot of various additional transmission torque parameters versus time. The vertical axis represents torque and torque increases in the direction of the vertical axis up arrow. The horizontal axis represents time and time increases from the left side of the figure to the right side of the figure. Dotted line 1020 represents torque capacity of the transmission's second input clutch (e.g., 127 of FIG. 3). Solid line 1022 represents torque capacity of the transmission's first input clutch (e.g., 126 of FIG. 3). Thin solid line 1024 represents transmission input torque without torque modification (e.g., driver demand engine torque modified to compensate for transmission clutch slippage, instantaneous transmission torque limits, transmission hardware torque limits, and other transmission conditions). Dashed line 1012 represents the actual transmission input torque. Dash-dash-dot line 1025 represents transmission input torque in the new gear immediately after the gear shift.

The fourth plot from the top of FIG. 10 is a plot of transmission torque ratio versus time. The vertical axis represents transmission torque ratio and transmission torque ratio increases in the direction of the vertical axis arrow. The horizontal axis represents time and time increases from the left side of the figure to the right side of the figure. Solid line 1030 represents actual transmission torque ratio (e.g., ratio of transmission input torque to transmission output torque). Dashed line 1032 represents reported transmission torque ratio (e.g., ratio of transmission input torque to transmission output torque as determined from transmission input speed to transmission output speed). Solid line 1030 and dashed line 1032 are equivalent when only solid line 1030 is visible.

The horizontal axis of each plot corresponds to a value of zero for the vertical axis unless otherwise noted. Further, the vertical axis of each plot corresponds to a value of zero time. In addition, torque values above horizontal axes are adding positive torque and torque values below the horizontal axis provide negative torque. Torque values for the various signals may be the same when described as such even though a small gap between traces is shown in the figure. The small gap is shown between traces in some places to improve legibility.

At time T40, the engine speed 1002 is increasing and the driver demand engine and integrated starter/generator torque 1008 is at a middle level. Actual transmission input torque 1012 is at a higher level that is equal to the driver demand torque 1008 plus torque to counteract the rear drive unit electric machine torque 1016. The sum of transmission input torque (e.g., engine torque and integrated starter/generator torque) and rear drive unit torque reflected to the transmission input clutch housing 1010 (e.g., rear drive unit electric machine torque divided by the estimated transmission torque ratio) is substantially equal to the driver demand engine and integrated starter/generator torque 1008 (e.g., within 3% of each other). The transmission input maximum instantaneous torque limit 1004 is at a higher level and the transmission input minimum instantaneous torque limit 1014 is at zero. The transmission input torque in the new gear immediately after the gear shift 1025 is not determined at time T40 since the transmission gear shift has not started. The rear drive unit electric machine torque 1016 is a negative value indicating that the battery is being charged via the rear drive unit electric machine. The torque capacity of the transmission's first input clutch 1022 is at a higher level and the transmission input torque with modification 1024 also at a higher level. The transmission actual input torque 1012 is at a level equal to the transmission input torque with modification 1024. The torque capacity of the transmission's second input clutch 1020 is zero. The actual transmission torque ratio 1030 and the reported transmission torque ratio 1032 are at a higher value reflecting that a lower gear is engaged (e.g., $1^{st}$ gear), which provides a higher torque ratio.

At time T41, a power-on upshift begins and the transmission gear shift enters a torque transfer phase. Engine speed 1002 continues to increase at its previous rate and driver demand engine and integrated starter/generator torque 1008 are at a slightly lower level than at time T40. The torque capacity of the transmission's first input clutch 1022 (e.g., off-going clutch) starts to be reduced. The transmission input minimum instantaneous torque limit 1014 continues on at its previous level. The actual transmission input torque 1012 also continues on at its same level. The sum of transmission input torque (e.g., engine torque and integrated starter/generator torque) and rear drive unit torque reflected to the transmission input clutch housing 1010 also continues on its same trajectory. The transmission input maximum instantaneous torque limit 1004 remains at a higher level and the transmission input torque with modification 1024 continues on at its previous level. The torque capacity of the second clutch 1020 is zero. The actual transmission torque ratio 1030 and the reported transmission torque ratio 1032 are at a same level. The rear drive unit electric machine torque 1016 gradually decreases and the transmission input torque in the new gear immediately after the gear shift 1025 is at a level equal to the actual transmission input torque 1012 so that engine load may be maintained after the transmission gear shift.

Between time T41 and time T42, the engine speed 1002 continues to increase and the driver demand engine and integrated starter generator torque 1008 gradually decreases and then increases in response to the increase in the transmission minimum instantaneous torque limit 1014 increasing. The sum of transmission input torque and rear drive unit torque reflected to the transmission input clutch housing 1010 and the actual transmission input torque 1012 also increase in response to the transmission input minimum instantaneous torque limit 1014 increasing. The transmission input minimum instantaneous torque limit 1014 is increased to fill a torque hole that may develop when the off-going clutch is released. The transmission input maximum instantaneous torque limit 1004 remains at a higher level. The torque capacity of the transmission's second input clutch 1020 (e.g., on-coming clutch) also begins to increase while the transmission's first input clutch capacity 1022 continues to be decreased. The transmission torque with modification 1024 increases in response to the transmission input minimum instantaneous torque limit increasing. The rear drive unit electric machine torque 1016 decreases gradually. The transmission's actual torque ratio 1030 continues to be reduced and the reported transmission torque ratio 1032 remains constant. The transmission input minimum instantaneous torque limit 1014 increases step-wise and then gradually increases as torque capacity of the first transmission clutch 1022 decreases. The transmission input torque in the new gear immediately after the gear shift 1025 is remains constant.

At time T42, the torque transfer phase of the power-on upshift ends and the inertia phase of the power-on upshift begins. The torque transfer phase ends when the torque capacity of the transmission's first input clutch 1022 is zero or substantially zero (e.g., less than 5 Nm). The transmission input minimum instantaneous torque limit 1014 is reduced to zero to cease torque hole filling during the torque transfer phase and the actual transmission input torque 1012 is decreased shortly after time T42 in response to reducing the transmission input minimum instantaneous input torque limit 1014 and reducing the transmission input maximum instantaneous input torque limit 1004. Engine speed 1002 begins to be reduced during the inertia phase of the transmission gear shift and torque capacity of the second clutch 1020 begins to be reduced. The sum of transmission input torque and rear drive unit electric machine torque reflected to the clutch housing input 1010 continues on its same trajectory. The transmission input torque without torque modification 1024 remains constant at it previous value. The reported torque ratio 1032 and the actual torque ratio 1030 continue at a constant value. The rear drive unit electric machine torque 1016 is gradually reduced. The transmission input torque in the new gear immediately after the gear shift 1025 continues at a same level.

Between time T42 and time T43, the engine speed 1002 continues to decrease and driver demand engine. The integrated starter/generator torque 1008 is decreased near time T42 and is increased near time T43. The transmission input minimum instantaneous torque limit 1014 remains at zero and the sum of transmission input torque and rear drive unit electric machine torque reflected to the transmission input clutch housing 1010 is reduced to less than the transmission input maximum instantaneous torque limit 1004 before increasing again at time T43. The transmission input maximum instantaneous torque limit 1004 is constant for a period of time and then it increases near time T43 in response to the transmission input maximum instantaneous torque limit 1004 increasing. The rear drive unit electric machine torque reflected at the transmission input clutch housing 1016 increases from time T42 to time T43. The capacity of the first clutch 1022 remains at zero and the capacity of the second clutch 1020 is gradually reduced. The transmission input torque with modification 1024 remains at a constant value. The actual transmission input torque 1012 continues to follow the transmission input instantaneous maximum torque limit 1004. The reported torque ratio 1032 continues to decrease to the value of the actual torque ratio 1030. The transmission input torque in the new gear immediately after the gear shift 1025 continues to be reduced.

At time T43, the shift completes and the engine speed 1002 begins to accelerate. The driver demand engine and integrated starter/generator torque 1008 and the sum of transmission input torque and rear drive unit electric machine torque reflected to the transmission input clutch housing 1010 are substantially the same values (e.g., within ±3 percent of each other). The rear drive unit electric machine torque reflected to the transmission input clutch housing 1016 begins to gradually decrease and the transmission input maximum instantaneous torque limit 1004 is a higher value. The transmission input minimum instantaneous torque 1014 is a value of zero and the second clutch torque capacity 1020 reaches a high value. The first clutch torque capacity 1022 is zero and the transmission input torque with modification 1024 is equal to the actual transmission input torque 1012. The driver demand engine and integrated starter/generator torque 1008 begins to be gradually reduced. The actual transmission torque 1012 is equal to transmission input torque in the new gear immediately after the gear shift 1025. The reported torque ratio 1032 is equal to the value of the actual torque ratio 1030.

In this way, an engine may deliver power to charge a battery via the rear drive unit electric machine while a smooth gear shift is performed. In particular, on-coming clutch torque capacity may be adjusted in response to a transmission input torque expected to be applied after the shift is complete and a new gear is engaged.

Thus, the methods herein provide for a driveline operating method, comprising: during a first condition, adjusting a transmission input torque actuator during a power-on upshift torque transfer phase via a controller in response to a transmission instantaneous lower input torque threshold, the transmission instantaneous lower input torque threshold responsive to torque capacity of an on-coming clutch, a torque ratio of a transmission engaged in a first gear, and a torque ratio of the transmission engaged in a second gear. The method includes where transmission instantaneous lower input torque threshold is further responsive to a transmission input torque without modification, and further comprising: adjusting torque of one or more front wheel electric machines during the power-on upshift torque transfer phase in response to a torque ratio of the transmission. The method further comprises during a second condition, adjusting rear drive unit electric machine torque responsive to a result of the torque ratio of the transmission engaged in the first gear divided by the torque ratio of the transmission engaged in the second gear and torque capacity of the on-coming clutch. The method includes where the first condition is a battery state of charge less than a threshold, and where the second condition is the battery state of charge greater than the threshold. The method includes where adjusting rear drive unit electric machine torque includes increasing positive torque output of the rear drive unit electric machine. The method further comprises determining a desired duration of the power-on upshift torque transfer phase. The method further comprises modifying a response of the torque capacity of the on-coming clutch and the transmission instantaneous lower input torque threshold responsive to the desired duration of the power-on upshift torque transfer phase.

The methods included herein also provide for a driveline operating method, comprising: during a first condition, adjusting a transmission on-coming clutch torque capacity during a power-on upshift torque transfer phase of a gear shift via a controller in response to a transmission input torque without modification, a torque ratio of a transmission engaged in a first gear, and a torque ratio of the transmission engaged in a second gear. The method includes where the first condition is when engine torque and integrated starter/generator torque is adjusted to a transmission instantaneous lower threshold torque during the power-on upshift torque transfer phase. The method further comprises adjusting the transmission on-coming clutch torque capacity during the power-on upshift torque transfer phase to a value of the transmission input torque without modification multiplied by an amount of time since start of the power-on upshift torque transfer phase divided by a duration of the power-on upshift torque transfer phase via the controller during a second condition.

In some examples, the method includes where the second condition is when a total effect of the rear drive unit electric machine torque plus engine torque and integrated starter/generator torque is adjusted to the transmission instantaneous lower threshold torque during the power-on upshift torque transfer phase. The method further comprises determining a duration of a power-on upshift gear change in response to a transmission instantaneous lower input torque threshold and the transmission on-coming clutch torque capacity. The method further comprises adjusting the transmission on-coming clutch torque capacity during an inertia phase of the power-on upshift. The method includes where the transmission on-coming clutch torque capacity is reduced during the inertia phase of the power-on upshift.

The methods describe herein also provide for a driveline operating method, comprising: adjusting a transmission on-coming clutch torque capacity during an inertia phase of a power-on upshift via a controller in response to a transmission input torque in a new gear immediately after the power-on upshift, a torque ratio of a transmission while engaged in an old gear before the power-on upshift, a torque ratio of the transmission while engaged in the new gear, a transmission input torque in an old gear immediately before the power-on upshift, and a desired duration of the power-on upshift. The method further comprises adjusting a transmission input torque actuator during the inertia phase of the power-on upshift via the controller in response to the transmission input torque in the old gear immediately before the gear shift, the transmission input torque in the new gear immediately after the gear shift, the torque ratio of the transmission while engaged in the old gear before the gear shift, the torque ratio of the transmission while engaged in the new gear, a transmission inertia, and angular output speed of the transmission.

The method further comprises providing charge to a battery via a rear drive unit electric machine during the desired duration of the power-on upshift. The method further comprises adjusting a transmission instantaneous lower input torque threshold and a transmission instantaneous upper input torque threshold in response to a difference between a transmission torque ratio and a transmission speed ratio. The method further comprises adjusting output of the rear drive unit electric machine during the inertia phase of the power-on upshift to maintain engine torque at a desired value before and after the power-on upshift. The method includes where the transmission input torque in the new gear immediately after the power-on upshift is determined before the new gear is fully engaged.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware.

Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A driveline operating method, comprising:
during a first condition, adjusting a transmission input torque actuator during a power-on upshift torque transfer phase via a controller in response to a transmission instantaneous lower input torque threshold, the transmission instantaneous lower input torque threshold responsive to torque capacity of an on-coming clutch, a torque ratio of a transmission engaged in a first gear, and a torque ratio of the transmission engaged in a second gear.

2. The method of claim 1, where transmission instantaneous lower input torque threshold is further responsive to a transmission input torque without modification, and further comprising:
adjusting torque of one or more front wheel electric machines during the power-on upshift torque transfer phase in response to the torque ratio of the transmission engaged in the second gear.

3. The method of claim 1, further comprising during a second condition, adjusting rear drive unit electric machine torque responsive to a result of the torque ratio of the transmission engaged in the first gear divided by the torque ratio of the transmission engaged in the second gear and the torque capacity of the on-coming clutch.

4. The method of claim 3, where the first condition is a battery state of charge less than a threshold, and where the second condition is the battery state of charge greater than the threshold.

5. The method of claim 3, where adjusting the rear drive unit electric machine torque includes increasing positive torque output of a rear drive unit electric machine.

6. The method of claim 1, further comprising determining a desired duration of the power-on upshift torque transfer phase.

7. The method of claim 6, further comprising modifying a response of the torque capacity of the on-coming clutch and the transmission instantaneous lower input torque threshold responsive to the desired duration of the power-on upshift torque transfer phase.

8. A driveline operating method, comprising:
during a first condition, adjusting a transmission on-coming clutch torque capacity during a power-on upshift torque transfer phase of a gear shift via a controller in response to a transmission input torque without modification, a torque ratio of a transmission engaged in a first gear, and a torque ratio of the transmission engaged in a second gear.

9. The method of claim 8, where the first condition is when engine torque and integrated starter/generator torque are adjusted to a transmission instantaneous lower threshold torque during the power-on upshift torque transfer phase.

10. The method of claim 9, further comprising adjusting the transmission on-coming clutch torque capacity during the power-on upshift torque transfer phase to a value of the transmission input torque without modification multiplied by an amount of time since start of the power-on upshift torque transfer phase divided by a duration of the power-on upshift torque transfer phase via the controller during a second condition.

11. The method of claim 10, where the second condition is when a total effect of a rear drive unit electric machine torque plus engine torque and integrated starter/generator torque is adjusted to the transmission instantaneous lower threshold torque during the power-on upshift torque transfer phase.

12. The method of claim 8, further comprising determining a duration of a power-on upshift gear change in response to a transmission instantaneous lower input torque threshold and the transmission on-coming clutch torque capacity.

13. The method of claim 8, in another representation further comprises adjusting the transmission on-coming clutch torque capacity during an inertia phase of a power-on upshift.

14. The method of claim 13, where the transmission on-coming clutch torque capacity is reduced during the inertia phase of the power-on upshift.

15. A driveline operating method, comprising:
adjusting a transmission on-coming clutch torque capacity during an inertia phase of a power-on upshift via a controller in response to a transmission input torque in a new gear immediately after the power-on upshift, a torque ratio of a transmission while engaged in an old gear before the power-on upshift, a torque ratio of the transmission while engaged in the new gear, a transmission input torque in the old gear immediately before the power-on upshift, and a desired duration of the power-on upshift.

16. The method of claim 15, further comprising adjusting a transmission input torque actuator during the inertia phase of the power-on upshift via the controller in response to the transmission input torque in the old gear immediately before the power-on upshift, the transmission input torque in the new gear immediately after the power-on upshift, the torque ratio of the transmission while engaged in the old gear before the power-on upshift, the torque ratio of the transmission while engaged in the new gear, a transmission inertia, and angular output speed of the transmission.

17. The method of claim 16, further comprising providing charge to a battery via a rear drive unit electric machine during the desired duration of the power-on upshift.

18. The method of claim 17, further comprising adjusting a transmission instantaneous lower input torque threshold and a transmission instantaneous upper input torque threshold in response to a difference between a transmission torque ratio and a transmission speed ratio.

19. The method of claim 17, further comprising adjusting output of the rear drive unit electric machine during the inertia phase of the power-on upshift to maintain engine torque at a desired value before and after the power-on upshift.

20. The method of claim 15, where the transmission input torque in the new gear immediately after the power-on upshift is determined before the new gear is fully engaged.

* * * * *